(12) United States Patent
Carrington

(10) Patent No.: US 12,467,887 B2
(45) Date of Patent: Nov. 11, 2025

(54) SYSTEMS AND METHODS FOR ELIMINATING CROSS-TALK SIGNALS IN ONE OR MORE SCANNING SYSTEMS HAVING MULTIPLE X-RAY SOURCES

(71) Applicant: Rapiscan Systems, Inc., Torrance, CA (US)

(72) Inventor: Neil Duncan Carrington, Manchester (GB)

(73) Assignee: Rapiscan Systems, Inc., Torrance, CA (US)

(*) Notice: Subject to any disclaimer, the term of this patent is extended or adjusted under 35 U.S.C. 154(b) by 0 days.

(21) Appl. No.: 18/461,355

(22) Filed: Sep. 5, 2023

(65) Prior Publication Data

US 2024/0060913 A1    Feb. 22, 2024

Related U.S. Application Data

(63) Continuation of application No. 17/652,264, filed on Feb. 23, 2022, now Pat. No. 11,796,489.
(Continued)

(51) Int. Cl.
G01N 23/203        (2006.01)
G01N 23/20008     (2018.01)

(52) U.S. Cl.
CPC ..... *G01N 23/203* (2013.01); *G01N 23/20008* (2013.01); *G01N 2223/053* (2013.01); *G01N 2223/501* (2013.01)

(58) Field of Classification Search
None
See application file for complete search history.

(56) References Cited

U.S. PATENT DOCUMENTS 2,636,619 A    4/1953  Alexander
2,831,123 A    4/1958  Daly
(Continued)

FOREIGN PATENT DOCUMENTS

AT    406586 T    9/2008
AT    553401 T    4/2012
(Continued)

OTHER PUBLICATIONS

International Search Report for PCT/GB2009/001277, Jul. 20, 2010, Rapiscan Systems Inc.
(Continued)

*Primary Examiner* — Hoon K Song
(74) *Attorney, Agent, or Firm* — Novel IP

(57) ABSTRACT

The present specification describes a system for eliminating X-ray crosstalk between a plurality of X-ray scanning systems and passive radiation detectors. The system includes a frequency generator for generating a common operational frequency, a high-energy X-ray source or scanning system coupled with the frequency generator for receiving the common operational frequency and configured to modify the pulse repetition frequency of the high-energy X-ray source or scanning system in order to synchronize with the common operational frequency and a low-energy X-ray scanning system and/or passive radiation detection system coupled with the frequency generator for receiving the common operational frequency and having a processing module configured to remove data associated with the common operational frequency at an instance of time if the high-energy X-ray source or scanning system has emitted X-rays at the instance of time.

20 Claims, 19 Drawing Sheets

Related U.S. Application Data

(60) Provisional application No. 63/152,721, filed on Feb. 23, 2021.

(56) References Cited

U.S. PATENT DOCUMENTS

| | | |
|---|---|---|
| 2,971,433 A | 2/1961 | Akin |
| 3,275,831 A | 9/1966 | Martin |
| 3,374,355 A | 3/1968 | Parratt |
| 3,439,166 A | 4/1969 | Chope |
| 3,676,783 A | 7/1972 | Kinbara |
| 3,766,387 A | 10/1973 | Heffan |
| 3,767,850 A | 10/1973 | McMillian et al. |
| 3,770,955 A | 11/1973 | Tomita |
| 3,784,837 A | 1/1974 | Holmstrom |
| 3,837,502 A | 9/1974 | Hornagold |
| 3,904,923 A | 9/1975 | Schwartz |
| 3,988,586 A | 10/1976 | Stuart |
| 4,047,035 A | 9/1977 | Dennhoven |
| 4,139,771 A | 2/1979 | Dennhoven |
| 4,164,138 A | 8/1979 | Burkhart |
| 4,210,811 A | 7/1980 | Dennhoven |
| 4,216,499 A | 8/1980 | Dennhoven |
| 4,239,969 A | 12/1980 | Galetta |
| 4,366,382 A | 12/1982 | Kotowski |
| 4,430,568 A | 2/1984 | Yoshida |
| 4,563,707 A | 1/1986 | Kishida |
| 4,566,113 A | 1/1986 | Doenges |
| 4,599,740 A | 7/1986 | Cable |
| 4,626,688 A | 12/1986 | Barnes |
| 4,641,330 A | 2/1987 | Herwig |
| 4,658,408 A | 4/1987 | Amor |
| 4,709,382 A | 11/1987 | Sones |
| 4,736,401 A | 4/1988 | Donges |
| 4,788,704 A | 11/1988 | Donges |
| 4,817,123 A | 3/1989 | Sones |
| 4,825,454 A | 4/1989 | Annis |
| 4,853,595 A | 8/1989 | Alfano |
| 4,872,188 A | 10/1989 | Lauro |
| 4,884,289 A | 11/1989 | Glockmann |
| 4,975,917 A | 12/1990 | Villa |
| 4,979,202 A | 12/1990 | Siczek |
| 4,991,189 A | 2/1991 | Boomgaarden |
| 5,006,299 A | 4/1991 | Gozani |
| 5,014,293 A | 5/1991 | Boyd |
| 5,022,062 A | 6/1991 | Annis |
| 5,041,728 A | 8/1991 | Spacher |
| 5,065,418 A | 11/1991 | Bermbach |
| 5,076,993 A | 12/1991 | Sawa |
| 5,091,924 A | 2/1992 | Bermbach |
| 5,098,640 A | 3/1992 | Gozani |
| 5,114,662 A | 5/1992 | Gozani |
| 5,179,581 A | 1/1993 | Annis |
| 5,181,234 A | 1/1993 | Smith |
| 5,182,764 A | 1/1993 | Peschmann |
| 5,185,778 A | 2/1993 | Magram |
| 5,197,088 A | 3/1993 | Vincent |
| 5,202,932 A | 4/1993 | Cambier |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,259,012 A | 11/1993 | Baker |
| 5,313,511 A | 5/1994 | Annis |
| 5,363,940 A | 11/1994 | Fahrion |
| 5,367,552 A | 11/1994 | Peschmann |
| 5,379,334 A | 1/1995 | Zimmer |
| 5,493,596 A | 2/1996 | Annis |
| 5,503,424 A | 4/1996 | Agopian |
| 5,548,123 A | 8/1996 | Perez-Mendez |
| 5,548,630 A | 8/1996 | Hell |
| 5,600,303 A | 2/1997 | Husseiny |
| 5,602,894 A | 2/1997 | Bardash |
| 5,606,167 A | 2/1997 | Miller |
| 5,608,214 A | 3/1997 | Baron |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,692,028 A | 11/1997 | Geus |
| 5,692,029 A | 11/1997 | Husseiny |
| 5,751,837 A | 5/1998 | Watanabe |
| 5,763,903 A | 6/1998 | Mandai |
| 5,764,683 A | 6/1998 | Swift |
| 5,768,334 A | 6/1998 | Maitrejean |
| 5,787,145 A | 7/1998 | Geus |
| 5,805,660 A | 9/1998 | Perion |
| 5,838,759 A | 11/1998 | Armistead |
| 5,842,578 A | 12/1998 | Cordeiro |
| 5,903,623 A | 5/1999 | Swift |
| 5,909,478 A | 6/1999 | Polichar |
| 5,910,973 A | 6/1999 | Grodzins |
| 5,930,326 A | 7/1999 | Rothschild |
| 5,940,468 A | 8/1999 | Huang |
| 5,974,111 A | 10/1999 | Krug |
| 6,011,266 A | 1/2000 | Bell |
| 6,031,890 A | 2/2000 | Bermbach |
| 6,056,671 A | 5/2000 | Marmer |
| 6,058,158 A | 5/2000 | Eiler |
| 6,067,344 A | 5/2000 | Grodzins |
| 6,081,580 A | 6/2000 | Grodzins |
| 6,094,472 A | 7/2000 | Smith |
| 6,125,165 A | 9/2000 | Warburton |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,216,540 B1 | 4/2001 | Nelson |
| 6,218,943 B1 | 4/2001 | Ellenbogen |
| 6,220,099 B1 | 4/2001 | Marti |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,301,327 B1 | 10/2001 | Martens |
| 6,320,933 B1 | 11/2001 | Grodzins |
| 6,347,132 B1 | 2/2002 | Annis |
| 6,356,620 B1 | 3/2002 | Rothschild |
| 6,373,066 B1 | 4/2002 | Penn |
| 6,418,194 B1 | 7/2002 | Mcpherson |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,448,564 B1 | 9/2002 | Johnson |
| 6,453,003 B1 | 9/2002 | Springer |
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,546,072 B1 | 4/2003 | Chalmers |
| 6,552,346 B2 | 4/2003 | Verbinski |
| 6,563,903 B2 | 5/2003 | Kang |
| 6,580,079 B1 | 6/2003 | Craig |
| 6,580,778 B2 | 6/2003 | Meder |
| 6,584,170 B2 | 6/2003 | Aust |
| 6,597,760 B2 | 7/2003 | Beneke |
| 6,605,473 B1 | 8/2003 | Hajduk |

(56) References Cited

U.S. PATENT DOCUMENTS

| | | |
|---|---|---|
| 6,606,516 B2 | 8/2003 | Levine |
| 6,614,872 B2 | 9/2003 | Bueno |
| 6,636,581 B2 | 10/2003 | Sorenson |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,702,459 B2 | 3/2004 | Barnes |
| 6,713,773 B1 | 3/2004 | Lyons |
| 6,727,506 B2 | 4/2004 | Mallette |
| 6,763,635 B1 | 7/2004 | Lowman |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,134 B2 | 1/2005 | Saito |
| 6,839,403 B1 | 1/2005 | Kotowski |
| 6,843,599 B2 | 1/2005 | Le |
| 6,920,197 B2 | 7/2005 | Kang |
| 6,924,487 B2 | 8/2005 | Bolozdynya |
| 6,928,141 B2 | 8/2005 | Carver |
| 6,940,071 B2 | 9/2005 | Ramsden |
| 6,944,263 B2 | 9/2005 | Xiao |
| 6,965,314 B2 | 11/2005 | Jerry |
| 7,039,159 B2 | 5/2006 | Muenchau |
| 7,045,788 B2 | 5/2006 | Iwatschenko-Borho |
| 7,046,768 B1 | 5/2006 | Gilevich |
| 7,095,326 B2 | 8/2006 | Young |
| 7,099,434 B2 | 8/2006 | Adams |
| 7,103,137 B2 | 9/2006 | Seppi |
| 7,116,235 B2 | 10/2006 | Alioto |
| 7,151,447 B1 | 12/2006 | Willms |
| 7,166,844 B1 | 1/2007 | Gormley |
| 7,202,478 B2 | 4/2007 | Ramsden |
| 7,203,276 B2 | 4/2007 | Arsenault |
| 7,207,713 B2 | 4/2007 | Lowman |
| 7,215,737 B2 | 5/2007 | Li |
| 7,215,738 B2 | 5/2007 | Muenchau |
| 7,238,951 B2 | 7/2007 | Disdier |
| 7,239,245 B2 | 7/2007 | Kang |
| 7,244,947 B2 | 7/2007 | Polichar |
| 7,260,255 B2 | 8/2007 | Polichar |
| 7,277,526 B2 | 10/2007 | Rifkin |
| 7,302,035 B2 | 11/2007 | Hu |
| 7,322,745 B2 | 1/2008 | Agrawal |
| 7,335,891 B2 | 2/2008 | Kniss |
| 7,352,843 B2 | 4/2008 | Hu |
| 7,352,844 B1 | 4/2008 | Muenchau |
| 7,366,282 B2 | 4/2008 | Peschmann |
| 7,369,643 B2 | 5/2008 | Kotowski |
| 7,372,040 B2 | 5/2008 | Polichar |
| 7,379,530 B2 | 5/2008 | Hoff |
| 7,386,093 B2 | 6/2008 | Wu |
| 7,388,209 B1 | 6/2008 | Gormley |
| 7,397,891 B2 | 7/2008 | Johnson |
| 7,399,976 B2 | 7/2008 | Kang |
| 7,400,701 B1 | 7/2008 | Cason |
| 7,400,706 B2 | 7/2008 | Li |
| 7,412,025 B1 | 8/2008 | Bossi |
| 7,417,440 B2 | 8/2008 | Peschmann |
| 7,418,077 B2 | 8/2008 | Gray |
| 7,420,174 B2 | 9/2008 | Kurita |
| 7,453,987 B1 | 11/2008 | Richardson |
| 7,456,780 B1 | 11/2008 | Garren |
| 7,470,914 B2 | 12/2008 | Li |
| 7,471,764 B2 | 12/2008 | Kaval |
| 7,483,510 B2 | 1/2009 | Carver |
| 7,483,511 B2 | 1/2009 | Bendahan |
| 7,486,768 B2 | 2/2009 | Allman |
| 7,499,522 B2 | 3/2009 | Chen |
| 7,504,635 B2 | 3/2009 | Ramsden |
| 7,505,556 B2 | 3/2009 | Chalmers |
| 7,505,557 B2 | 3/2009 | Modica |
| 7,508,908 B2 | 3/2009 | Hu |
| 7,512,212 B2 | 3/2009 | Li |
| 7,517,149 B2 | 4/2009 | Agrawal |
| 7,519,148 B2 | 4/2009 | Kotowski |
| 7,525,101 B2 | 4/2009 | Grodzins |
| 7,526,064 B2 | 4/2009 | Akery |
| 7,547,887 B2 | 6/2009 | Ramsden |
| 7,547,888 B2 | 6/2009 | Cooke |
| 7,570,737 B2 | 8/2009 | Kang |
| 7,579,845 B2 | 8/2009 | Peschmann |
| 7,580,505 B2 | 8/2009 | Kang |
| 7,596,275 B1 | 9/2009 | Richardson |
| 7,634,055 B2 | 12/2009 | Hu |
| 7,647,189 B2 | 1/2010 | Kang |
| 7,649,976 B2 | 1/2010 | Georgeson |
| 7,660,388 B2 | 2/2010 | Gray |
| 7,663,109 B2 | 2/2010 | Kang |
| 7,683,336 B2 | 3/2010 | Ramsden |
| 7,684,538 B2 | 3/2010 | Morton |
| 7,684,541 B2 | 3/2010 | Wang |
| 7,702,070 B2 | 4/2010 | Kang |
| 7,720,195 B2 | 5/2010 | Allman |
| 7,722,251 B2 | 5/2010 | Kang |
| 7,724,868 B2 | 5/2010 | Morton |
| 7,724,869 B2 | 5/2010 | Wang |
| 7,738,687 B2 | 6/2010 | Tortora |
| 7,741,612 B2 | 6/2010 | Clothier |
| 7,742,568 B2 | 6/2010 | Smith |
| 7,760,103 B2 | 7/2010 | Frank |
| 7,760,852 B2 | 7/2010 | Chen |
| 7,769,133 B2 | 8/2010 | Carver |
| 7,783,003 B2 | 8/2010 | Clayton |
| 7,783,004 B2 | 8/2010 | Kotowski |
| 7,783,005 B2 | 8/2010 | Kaval |
| 7,800,073 B2 | 9/2010 | Clothier |
| 7,807,964 B2 | 10/2010 | Li |
| 7,809,104 B2 | 10/2010 | Foland |
| 7,817,775 B2 | 10/2010 | Kang |
| 7,817,776 B2 | 10/2010 | Agrawal |
| 7,820,973 B2 | 10/2010 | Ruan |
| 7,844,028 B2 | 11/2010 | Korsunsky |
| 7,852,981 B2 | 12/2010 | Luo |
| 7,856,081 B2 | 12/2010 | Peschmann |
| 7,860,213 B2 | 12/2010 | Akery |
| 7,876,879 B2 | 1/2011 | Morton |
| 7,876,880 B2 | 1/2011 | Kotowski |
| 7,903,789 B2 | 3/2011 | Morton |
| 7,915,596 B2 | 3/2011 | Clothier |
| 7,924,975 B2 | 4/2011 | Zhang |
| 7,928,400 B1 | 4/2011 | Diawara |
| 7,929,663 B2 | 4/2011 | Morton |
| 7,942,576 B2 | 5/2011 | Zhao |
| 7,947,957 B2 | 5/2011 | Ruan |
| 7,949,101 B2 | 5/2011 | Morton |
| 7,952,079 B2 | 5/2011 | Neustadter |
| 7,963,695 B2 | 6/2011 | Kotowski |
| 7,982,191 B2 | 7/2011 | Friedman |
| 7,991,113 B2 | 8/2011 | Carver |
| 7,991,133 B2 | 8/2011 | Mills |
| 7,995,705 B2 | 8/2011 | Allman |
| 8,013,297 B2 | 9/2011 | Peng |
| 8,031,903 B2 | 10/2011 | Paresi |
| 8,054,938 B2 | 11/2011 | Kaval |
| 8,059,781 B2 | 11/2011 | Agrawal |
| 8,073,099 B2 | 12/2011 | Niu |
| 8,084,748 B2 | 12/2011 | Peng |
| 8,085,897 B2 | 12/2011 | Morton |
| 8,094,784 B2 | 1/2012 | Morton |
| 8,129,691 B2 | 3/2012 | Hu |
| 8,135,110 B2 | 3/2012 | Morton |
| 8,138,770 B2 | 3/2012 | Peschmann |
| 8,170,177 B2 | 5/2012 | Akery |
| 8,173,970 B2 | 5/2012 | Inbar |
| 8,204,173 B2 | 6/2012 | Betcke |
| 8,217,365 B2 | 7/2012 | Chen |
| 8,223,919 B2 | 7/2012 | Morton |
| 8,243,876 B2 | 8/2012 | Morton |
| 8,247,776 B2 | 8/2012 | Peng |
| 8,263,938 B2 | 9/2012 | Bjorkholm |
| 8,275,091 B2 | 9/2012 | Morton |

(56) References Cited

U.S. PATENT DOCUMENTS

| | | |
|---|---|---|
| 8,288,718 B2 | 10/2012 | Li |
| 8,319,188 B2 | 11/2012 | Ramsden |
| 8,331,535 B2 | 12/2012 | Morton |
| 8,356,937 B2 | 1/2013 | Kotowski |
| 8,374,310 B2 | 2/2013 | Kang |
| 8,374,993 B2 | 2/2013 | Ramsden |
| 8,384,016 B2 | 2/2013 | Ramsden |
| 8,385,501 B2 | 2/2013 | Allman |
| 8,389,941 B2 | 3/2013 | Bendahan |
| 8,389,942 B2 | 3/2013 | Morton |
| 8,396,189 B2 | 3/2013 | Kang |
| 8,428,217 B2 | 4/2013 | Peschmann |
| 8,433,036 B2 | 4/2013 | Morton |
| 8,451,974 B2 | 5/2013 | Morton |
| 8,457,275 B2 | 6/2013 | Akery |
| 8,477,902 B2 | 7/2013 | Li |
| 8,483,356 B2 | 7/2013 | Bendahan |
| 8,491,189 B2 | 7/2013 | Kotowski |
| 8,502,699 B2 | 8/2013 | Zerwekh |
| 8,503,605 B2 | 8/2013 | Morton |
| 8,552,722 B2 | 10/2013 | Lionheart |
| 8,559,592 B2 | 10/2013 | Betcke |
| 8,579,506 B2 | 11/2013 | Morton |
| 8,582,857 B2 | 11/2013 | Chen |
| 8,625,735 B2 | 1/2014 | Morton |
| 8,644,453 B2 | 2/2014 | Morton |
| 8,668,386 B2 | 3/2014 | Morton |
| 8,674,706 B2 | 3/2014 | Peschmann |
| 8,679,409 B2 | 3/2014 | Zhang |
| 8,687,765 B2 | 4/2014 | Kotowski |
| 8,735,833 B2 | 5/2014 | Morto |
| 8,750,452 B2 | 6/2014 | Kaval |
| 8,774,357 B2 | 7/2014 | Morton |
| 8,798,232 B2 | 8/2014 | Bendahan |
| 8,804,899 B2 | 8/2014 | Morton |
| 8,824,637 B2 | 9/2014 | Morton |
| 8,831,176 B2 | 9/2014 | Morto |
| 8,831,305 B2 | 9/2014 | Zhang |
| 8,837,669 B2 | 9/2014 | Morton |
| 8,837,670 B2 | 9/2014 | Akery |
| 8,840,303 B2 | 9/2014 | Morton |
| 8,859,981 B1 | 10/2014 | Stoian |
| 8,885,794 B2 | 11/2014 | Morton |
| 8,908,831 B2 | 12/2014 | Bendahan |
| 8,913,707 B2 | 12/2014 | Kang |
| 8,929,509 B2 | 1/2015 | Morton |
| 8,958,526 B2 | 2/2015 | Morton |
| 8,963,094 B2 | 2/2015 | Gozani |
| 8,971,485 B2 | 3/2015 | Morton |
| 8,983,033 B2 | 3/2015 | Chen |
| 8,993,970 B2 | 3/2015 | Morton |
| 9,001,973 B2 | 4/2015 | Morton |
| 9,020,095 B2 | 4/2015 | Morton |
| 9,020,096 B2 | 4/2015 | Allman |
| 9,025,731 B2 | 5/2015 | Kotowski |
| 9,036,779 B2 | 5/2015 | Morton |
| 9,037,342 B2 | 5/2015 | Shi |
| 9,042,511 B2 | 5/2015 | Peschmann |
| 9,046,465 B2 | 6/2015 | Thompson |
| 9,046,613 B2 | 6/2015 | Ramsden |
| 9,048,061 B2 | 6/2015 | Morton |
| 9,052,403 B2 | 6/2015 | Morton |
| 9,057,679 B2 | 6/2015 | Morton |
| 9,081,099 B2 | 7/2015 | Kang |
| 9,086,497 B2 | 7/2015 | Bendahan |
| 9,093,245 B2 | 7/2015 | Morton |
| 9,111,331 B2 | 8/2015 | Parikh |
| 9,113,839 B2 | 8/2015 | Morton |
| 9,121,958 B2 | 9/2015 | Morton |
| 9,128,200 B2 | 9/2015 | Muenster |
| 9,158,027 B2 | 10/2015 | Morton |
| 9,158,030 B2 | 10/2015 | Morton |
| 9,182,515 B2 | 11/2015 | Stoian |
| 9,183,647 B2 | 11/2015 | Morton |
| 9,208,988 B2 | 12/2015 | Morton |
| 9,218,933 B2 | 12/2015 | Langeveld |
| 9,223,049 B2 | 12/2015 | Kotowski |
| 9,223,050 B2 | 12/2015 | Kaval |
| 9,223,052 B2 | 12/2015 | Morton |
| 9,263,225 B2 | 2/2016 | Morton |
| 9,268,027 B2 | 2/2016 | Kang |
| 9,268,044 B2 | 2/2016 | Ramsden |
| 9,268,058 B2 | 2/2016 | Peschmann |
| 9,274,065 B2 | 3/2016 | Morton |
| 9,279,901 B2 | 3/2016 | Akery |
| 9,285,498 B2 | 3/2016 | Carver |
| 9,310,322 B2 | 4/2016 | Panesar |
| 9,310,323 B2 | 4/2016 | Bendahan |
| 9,316,760 B2 | 4/2016 | Bendahan |
| 9,329,285 B2 | 5/2016 | Gozani |
| 9,332,624 B2 | 5/2016 | Morton |
| 9,420,677 B2 | 8/2016 | Morton |
| 9,442,082 B2 | 9/2016 | Morton |
| 9,465,119 B2 | 10/2016 | Manslow |
| 9,535,177 B2 | 1/2017 | Ramsden |
| 9,541,510 B2 | 1/2017 | Arodzero |
| 9,568,637 B2 | 2/2017 | Stoian |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,675,306 B2 | 6/2017 | Morton |
| 9,688,517 B2 | 6/2017 | Morton |
| 9,714,920 B2 | 7/2017 | Lionheart et al. |
| 9,720,111 B2 | 8/2017 | Ramsden |
| 9,726,619 B2 | 8/2017 | Thompson |
| 9,747,678 B2 | 8/2017 | Chen |
| 9,747,705 B2 | 8/2017 | Morton |
| 9,817,151 B2 | 11/2017 | Morton |
| 9,880,315 B2 | 1/2018 | Stoian |
| 9,958,569 B2 | 5/2018 | Morton |
| 10,007,019 B2 | 6/2018 | Morton |
| 10,032,021 B2 | 7/2018 | Pedersen |
| 10,107,783 B2 | 10/2018 | Lionheart et al. |
| 10,126,442 B2 | 11/2018 | Ramsden |
| 10,175,381 B2 | 1/2019 | Morton |
| 10,274,636 B2 | 4/2019 | Tang |
| 10,295,483 B2 | 5/2019 | Morton |
| 10,302,807 B2 | 5/2019 | Yu |
| 10,310,102 B2 | 6/2019 | Ramsden |
| 10,317,566 B2 | 6/2019 | Morton |
| 10,351,967 B2 | 7/2019 | Wang |
| 10,388,818 B2 | 8/2019 | Zhang |
| 10,408,967 B2 | 9/2019 | Morton |
| 10,429,523 B2 | 10/2019 | Ramsden |
| 10,473,795 B2 | 11/2019 | Wang |
| 10,483,077 B2 | 11/2019 | Morton |
| 10,585,207 B2 | 3/2020 | Morton |
| 10,586,324 B2 | 3/2020 | Zhao |
| 10,591,424 B2 | 3/2020 | Morton |
| 10,646,179 B2 | 5/2020 | Xu |
| 10,663,413 B2 | 5/2020 | Li |
| 10,663,616 B2 | 5/2020 | Morton |
| 10,677,943 B2 | 6/2020 | Moore |
| 10,739,491 B2 | 8/2020 | Yang |
| 10,775,320 B2 | 9/2020 | Li |
| 10,826,606 B1 | 11/2020 | Lundberg |
| 10,901,112 B2 | 1/2021 | Morton |
| 10,976,271 B2 | 4/2021 | Morton |
| 11,796,489 B2 * | 10/2023 | Carrington ............... G01V 5/20 |
| 2002/0094064 A1 | 7/2002 | Zhou |
| 2002/0130267 A1 | 9/2002 | Odom |
| 2003/0043964 A1 | 3/2003 | Sorenson |
| 2003/0068557 A1 | 4/2003 | Kumashiro |
| 2004/0017888 A1 | 1/2004 | Seppi |
| 2004/0051265 A1 | 3/2004 | Nadeau |
| 2004/0086078 A1 | 5/2004 | Adams |
| 2004/0104500 A1 | 6/2004 | Bross |
| 2004/0120454 A1 | 6/2004 | Ellenbogen |
| 2004/0125914 A1 | 7/2004 | Kang |
| 2004/0141584 A1 | 7/2004 | Bernardi |
| 2004/0178339 A1 | 9/2004 | Gentile |
| 2004/0252024 A1 | 12/2004 | Huey |
| 2004/0258198 A1 | 12/2004 | Carver |

(56) References Cited

U.S. PATENT DOCUMENTS

| | | |
|---|---|---|
| 2005/0023479 A1 | 2/2005 | Grodzins |
| 2005/0024199 A1 | 2/2005 | Huey |
| 2005/0100135 A1 | 5/2005 | Lowman |
| 2005/0117683 A1 | 6/2005 | Mishin |
| 2005/0117700 A1 | 6/2005 | Peschmann |
| 2005/0135668 A1 | 6/2005 | Polichar |
| 2005/0156734 A1 | 7/2005 | Zerwekh |
| 2005/0157842 A1 | 7/2005 | Agrawal |
| 2005/0161611 A1 | 7/2005 | Disdier |
| 2005/0169421 A1 | 8/2005 | Muenchau |
| 2005/0198226 A1 | 9/2005 | Delia |
| 2005/0226383 A1 | 10/2005 | Rifkin |
| 2005/0275545 A1 | 12/2005 | Alioto |
| 2006/0027751 A1 | 2/2006 | Kurita |
| 2006/0056584 A1 | 3/2006 | Allman |
| 2006/0114477 A1 | 6/2006 | Cox |
| 2006/0140341 A1 | 6/2006 | Carver |
| 2006/0176998 A1 | 8/2006 | Korsunsky |
| 2006/0182221 A1 | 8/2006 | Bernhardt |
| 2006/0249685 A1 | 11/2006 | Tanaka |
| 2006/0257005 A1 | 11/2006 | Bergeron |
| 2006/0284094 A1 | 12/2006 | Inbar |
| 2007/0085010 A1 | 4/2007 | Letant |
| 2007/0110215 A1 | 5/2007 | Hu |
| 2007/0140423 A1 | 6/2007 | Foland |
| 2007/0172129 A1 | 7/2007 | Tortora |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0237293 A1 | 10/2007 | Singh |
| 2007/0269005 A1 | 11/2007 | Chalmers |
| 2007/0272874 A1 | 11/2007 | Grodzins |
| 2007/0280416 A1 | 12/2007 | Bendahan |
| 2007/0280502 A1 | 12/2007 | Paresi |
| 2007/0286329 A1 | 12/2007 | Wang |
| 2007/0286337 A1 | 12/2007 | Wang |
| 2008/0037707 A1 | 2/2008 | Rothschild |
| 2008/0043917 A1 | 2/2008 | Oreper |
| 2008/0044801 A1 | 2/2008 | Modica |
| 2008/0048872 A1 | 2/2008 | Frank |
| 2008/0084963 A1 | 4/2008 | Clayton |
| 2008/0128624 A1 | 6/2008 | Cooke |
| 2008/0159591 A1 | 7/2008 | Ruedin |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0230709 A1 | 9/2008 | Tkaczyk |
| 2008/0260097 A1 | 10/2008 | Anwar |
| 2008/0304622 A1 | 12/2008 | Morton |
| 2009/0045348 A1 | 2/2009 | Stuenkel |
| 2009/0067575 A1 | 3/2009 | Seppi |
| 2009/0086907 A1 | 4/2009 | Smith |
| 2009/0116617 A1 | 5/2009 | Mastronardi |
| 2009/0127459 A1 | 5/2009 | Neustadter |
| 2009/0134334 A1 | 5/2009 | Nelson |
| 2009/0140158 A1 | 6/2009 | Clothier |
| 2009/0168964 A1 | 7/2009 | Safai |
| 2009/0200480 A1 | 8/2009 | Clothier |
| 2009/0238336 A1 | 9/2009 | Akery |
| 2009/0245462 A1 | 10/2009 | Agrawal |
| 2009/0257555 A1 | 10/2009 | Chalmers |
| 2009/0285353 A1 | 11/2009 | Ellenbogen |
| 2009/0316851 A1 | 12/2009 | Oosaka |
| 2010/0020937 A1 | 1/2010 | Hautmann |
| 2010/0098216 A1 | 4/2010 | Dobson |
| 2010/0161504 A1 | 6/2010 | Casey |
| 2010/0177868 A1 | 7/2010 | Smith |
| 2010/0177873 A1 | 7/2010 | Chen |
| 2010/0284509 A1 | 11/2010 | Oreper |
| 2010/0295689 A1 | 11/2010 | Armistead |
| 2010/0314549 A1 | 12/2010 | Wang |
| 2011/0019797 A1 | 1/2011 | Morton |
| 2011/0019799 A1 | 1/2011 | Shedlock |
| 2011/0038453 A1 | 2/2011 | Morton |
| 2011/0064192 A1 | 3/2011 | Morton |
| 2011/0075808 A1 | 3/2011 | Rothschild |
| 2011/0204243 A1 | 8/2011 | Bendahan |
| 2011/0235777 A1 | 9/2011 | Gozani |
| 2011/0266643 A1 | 11/2011 | Engelmann |
| 2011/0291014 A1 | 12/2011 | Kusner |
| 2012/0099710 A1 | 4/2012 | Kotowski |
| 2012/0104276 A1 | 5/2012 | Miller |
| 2012/0116720 A1 | 5/2012 | Klann |
| 2013/0001048 A1 | 1/2013 | Panesar |
| 2013/0039462 A1 | 2/2013 | Morton |
| 2013/0230139 A1 | 9/2013 | Morton |
| 2014/0185771 A1 | 7/2014 | Morton |
| 2014/0197321 A1 | 7/2014 | Bendahan |
| 2014/0226789 A1 | 8/2014 | Bendahan |
| 2014/0264058 A1 | 9/2014 | Chandrasekharan |
| 2015/0036798 A1 | 2/2015 | Morton |
| 2015/0078519 A1 | 3/2015 | Morton |
| 2015/0234082 A1 | 8/2015 | Stoian |
| 2015/0301220 A1 | 10/2015 | Morton |
| 2015/0338545 A1 | 11/2015 | Arodzero |
| 2015/0355117 A1 | 12/2015 | Morton |
| 2015/0355369 A1 | 12/2015 | Morton |
| 2016/0025889 A1 | 1/2016 | Morton |
| 2016/0033674 A1 | 2/2016 | Allman |
| 2018/0199904 A1 | 7/2018 | Ganguly |
| 2018/0280733 A1* | 10/2018 | Weidlich .............. A61B 6/4078 |
| 2019/0030366 A1* | 1/2019 | Maltz .................. A61B 5/0536 |
| 2020/0175733 A1* | 6/2020 | Yu ........................ G06T 11/005 |

FOREIGN PATENT DOCUMENTS

| | | |
|---|---|---|
| AU | 2008267661 B2 | 4/2011 |
| AU | 2008267660 B2 | 6/2011 |
| AU | 2014299147 B2 | 10/2016 |
| CA | 2481596 C | 11/2009 |
| CN | 101443679 A | 5/2009 |
| CN | 101504463 | 8/2009 |
| EP | 0077018 A1 | 4/1983 |
| EP | 0176314 | 4/1986 |
| EP | 0287707 | 10/1988 |
| EP | 0919186 A2 | 6/1999 |
| EP | 1413898 A1 | 4/2004 |
| EP | 1526392 | 4/2005 |
| EP | 1739460 A2 | 1/2007 |
| EP | 1328827 B1 | 8/2008 |
| EP | 2102636 B1 | 4/2012 |
| EP | 2019974 B1 | 8/2013 |
| EP | 2593813 B1 | 4/2014 |
| EP | 2075595 B1 | 4/2015 |
| EP | 2047293 B1 | 5/2015 |
| EP | 2705386 B1 | 9/2015 |
| EP | 2113791 B1 | 8/2016 |
| EP | 2883085 B1 | 8/2018 |
| EP | 1749220 B1 | 10/2019 |
| EP | 2287636 B1 | 10/2019 |
| EP | 3077852 B1 | 12/2019 |
| EP | 2673622 B1 | 4/2020 |
| EP | 2778716 B1 | 4/2020 |
| EP | 3474292 B1 | 9/2020 |
| EP | 3505975 B1 | 1/2021 |
| GB | 2255634 A | 11/1992 |
| GB | 2409268 A | 6/2005 |
| GB | 2401766 B | 3/2006 |
| GB | 2424065 A | 9/2006 |
| GB | 2418015 B | 12/2006 |
| GB | 2438317 A | 11/2007 |
| GB | 2445578 B | 1/2009 |
| GB | 2440588 B | 9/2009 |
| GB | 2432094 B | 4/2010 |
| GB | 2463254 B | 7/2010 |
| GB | 2437979 B | 12/2010 |
| GB | 2463707 B | 6/2011 |
| GB | 2472420 B | 2/2012 |
| GB | 2455906 B | 6/2012 |
| GB | 2490513 B | 11/2015 |
| GB | 2499391 B | 11/2015 |
| GB | 2504771 B | 2/2016 |
| GB | 2522017 B | 9/2017 |
| GB | 2520762 B | 4/2018 |

(56) References Cited

FOREIGN PATENT DOCUMENTS

| | | |
|---|---|---|
| GB | 2525826 B | 9/2020 |
| GB | 2555564 B | 9/2020 |
| GB | 2560552 B | 9/2020 |
| GB | 2577909 B | 11/2020 |
| GB | 2552538 B | 12/2020 |
| JP | 2009047559 A | 3/2009 |
| WO | 1998055851 A1 | 12/1998 |
| WO | 9913323 A2 | 3/1999 |
| WO | 1999013323 | 3/1999 |
| WO | 2004010127 A1 | 1/2004 |
| WO | 2004109331 | 12/2004 |
| WO | 2005098400 A2 | 10/2005 |
| WO | 2005121756 A2 | 12/2005 |
| WO | 2006036076 A1 | 4/2006 |
| WO | 2006045019 | 4/2006 |
| WO | 2006053279 A2 | 5/2006 |
| WO | 2006078691 A2 | 7/2006 |
| WO | 2006095188 | 9/2006 |
| WO | 2007035359 A2 | 3/2007 |
| WO | 2007051092 A2 | 5/2007 |
| WO | 2007055720 A2 | 5/2007 |
| WO | 2007068933 A1 | 6/2007 |
| WO | 2007103216 A2 | 9/2007 |
| WO | 2008017983 | 2/2008 |
| WO | 2009106803 A2 | 9/2009 |
| WO | 2009141613 | 11/2009 |
| WO | 2009141615 | 11/2009 |
| WO | 2009143169 A1 | 11/2009 |
| WO | 2009150416 A2 | 12/2009 |
| WO | 2011069024 A1 | 6/2011 |
| WO | 2011087861 A2 | 7/2011 |
| WO | 2011091070 A2 | 7/2011 |
| WO | 2013116241 A1 | 8/2013 |
| WO | 2013116549 | 8/2013 |
| WO | 2013119423 A1 | 8/2013 |
| WO | 2014107675 | 7/2014 |
| WO | 2014121097 A1 | 8/2014 |
| WO | 2014124152 A2 | 8/2014 |
| WO | 2016011205 | 1/2016 |

OTHER PUBLICATIONS

International Search Report PCT/GB2009/001444, Apr. 6, 2010, Rapiscan Security Products.
International Search Report PCT/GB2009/000515, Feb. 23, 2010, Rapiscan Security Products, Inc.
International Search Report for PCT/GB2009/000556, Feb. 19, 2010, Rapiscan Security Products, Inc.
Written Opinion on Patentability for PCT/US11/21758; Jul. 7, 2011; Rapiscan Systems.
International Search Report for PCT/GB2006/000859, mailed on May 19, 2006, Corus UK Ltd.
International Search Report for PCT/US2010/061908, mailed on Apr. 2, 2012, Rapiscan Systems, Inc.
CRS Report for Congress, Aviation Security Technologies and Procedures: Screening Passengers and Baggage, Oct. 26, 2001, pp. 1-12.
International Search Report for PCT/GB2009/001250, Mar. 2, 2010, Rapiscan Security Products Inc.
International Search Report for PCT/US10/58809; Rapiscan Systems Inc .; Apr. 19, 2011.
"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.--details.php?catid=20 [retrieved on Jan. 6, 2010].
Smith C. R. et al.: 'Application of 450 kV computed tomography to engine blocks with steel liners' Materials Evaluation vol. 65, No. 5, 2007, pp. 458-461, XP055108238.
Mobile X-Ray Inspection Systems, Internet Citation, Feb. 12, 2007, pp. 1-2, URL:http://web.archive.org/web/20070212000928/http://www.bombdetecti-on.com/cat--details.php?catid=20.
Molchanov P A et al: 'Nanosecond gated optical sensors for ocean optic applications' Sensors Applications Symposium, 2006. Proceedings of the 2006 IEEE Houston, Texas, USA Feb. 7-9, 2006, Piscataway, NJ, USA, IEEE, Feb. 7, 2006 (2006-02-07) , pp. 147-150, XP010917671 ISBN: 978-0-7803-9580-0.
International Search Report for PCT/US11/21758; Jul. 7, 2011, Rapiscan Systems Inc.
Written Opinion of the International Searching Authority for PCT/US2014/015126, May 27, 2014.
International Search Report for PCT/US13/24191, Rapiscan Systems Inc., mailed on Jun. 25, 2013.
International Search Report for PCT/US13/23676, Jun. 28, 2013.
International Search Report for PCT/GB2009/000497, Jan. 22, 2010.
International Search Report for PCT/US14/56652, Apr. 27, 2015.
Misso et al., "New developments in radiation detectors and electron multipliers", 1964, IEEE Transactions on Nuclear Science pp. 72-75.
International Preliminary Report on Patentability for PCT/US2014/014198, Aug. 4, 2015.
International Preliminary Report on Patentability for PCT/US11/21758, Jul. 7, 2011.
International Search Report for PCT/US2014/015126, May 27, 2014.
International Search Report for PCT/US14/14198, May 16, 2014.
International Search Report for PCT/US2015/040653, Dec. 16, 2015.
International Search Report for PCT/US2014/010370, May 13, 2014.
International Search Report for PCT/GB09/00575, Apr. 7, 2010.
King et al, 'Development of B-Based He Replacement Neutron Detectors', AIP Conf. Proc. 1412, 216-223 (2011); doi: 10.1063/1.3665317.
International Search Report for PCT/GB2009/001275, Jul. 24, 2009, Rapiscan Security Products Inc.
International Search Report for PCT/US2012/054110, Dec. 24, 2012.
International Search Report for PCT/US22/70799, Jul. 25, 2022.

\* cited by examiner

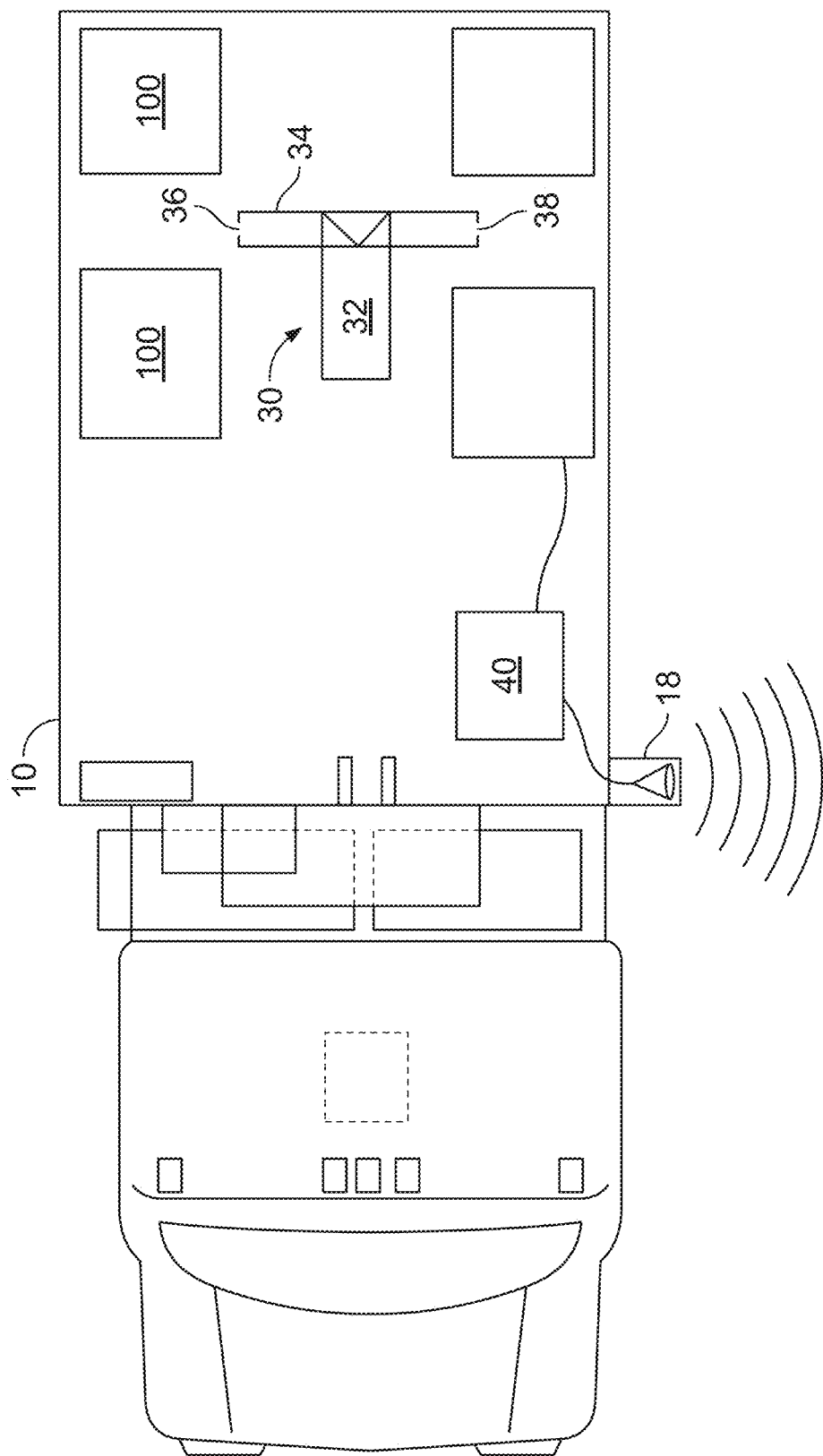

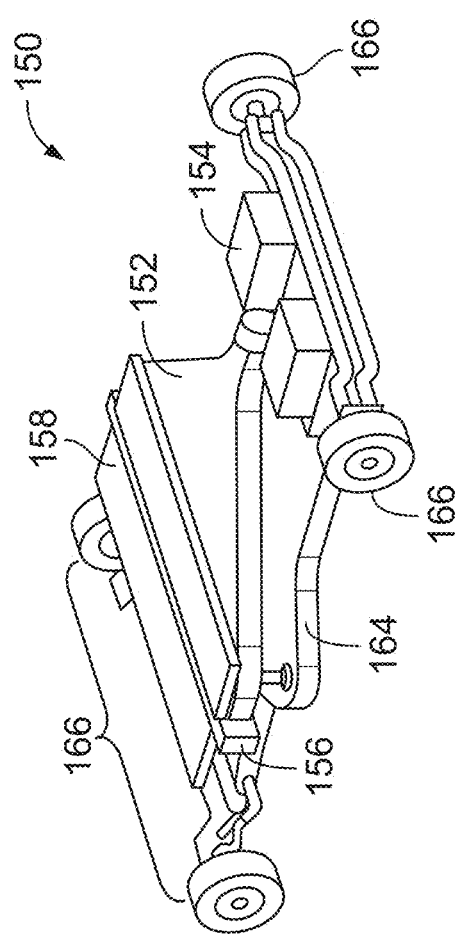
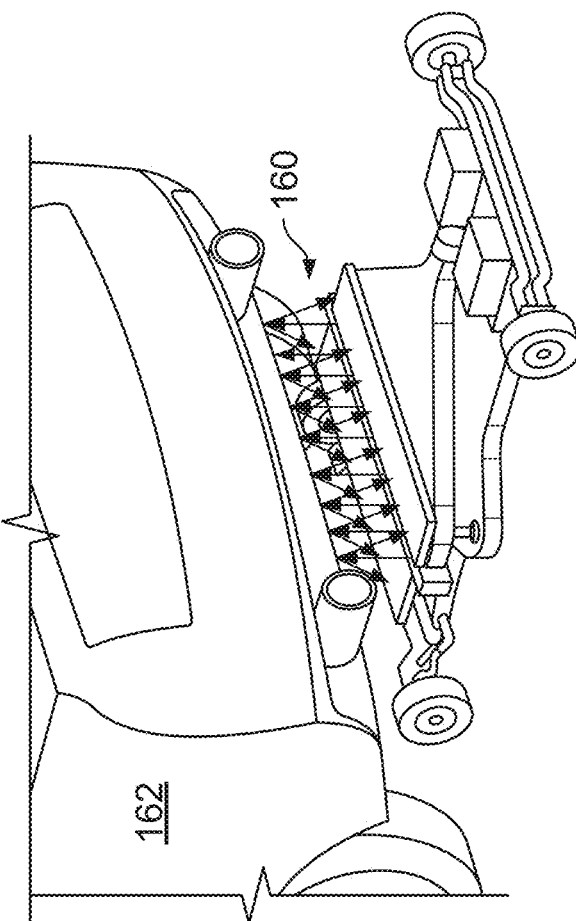
FIG. 1E
FIG. 1F

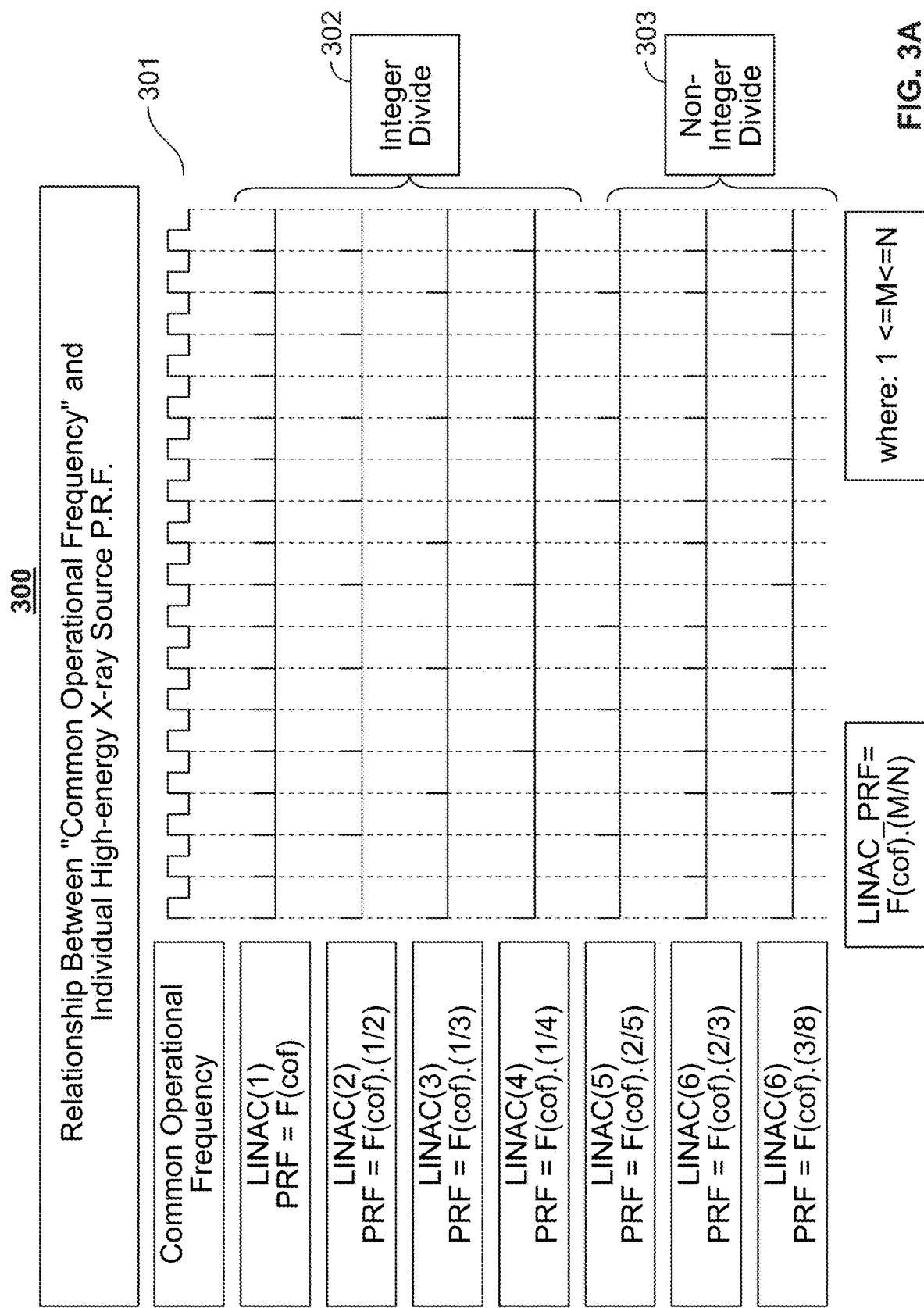

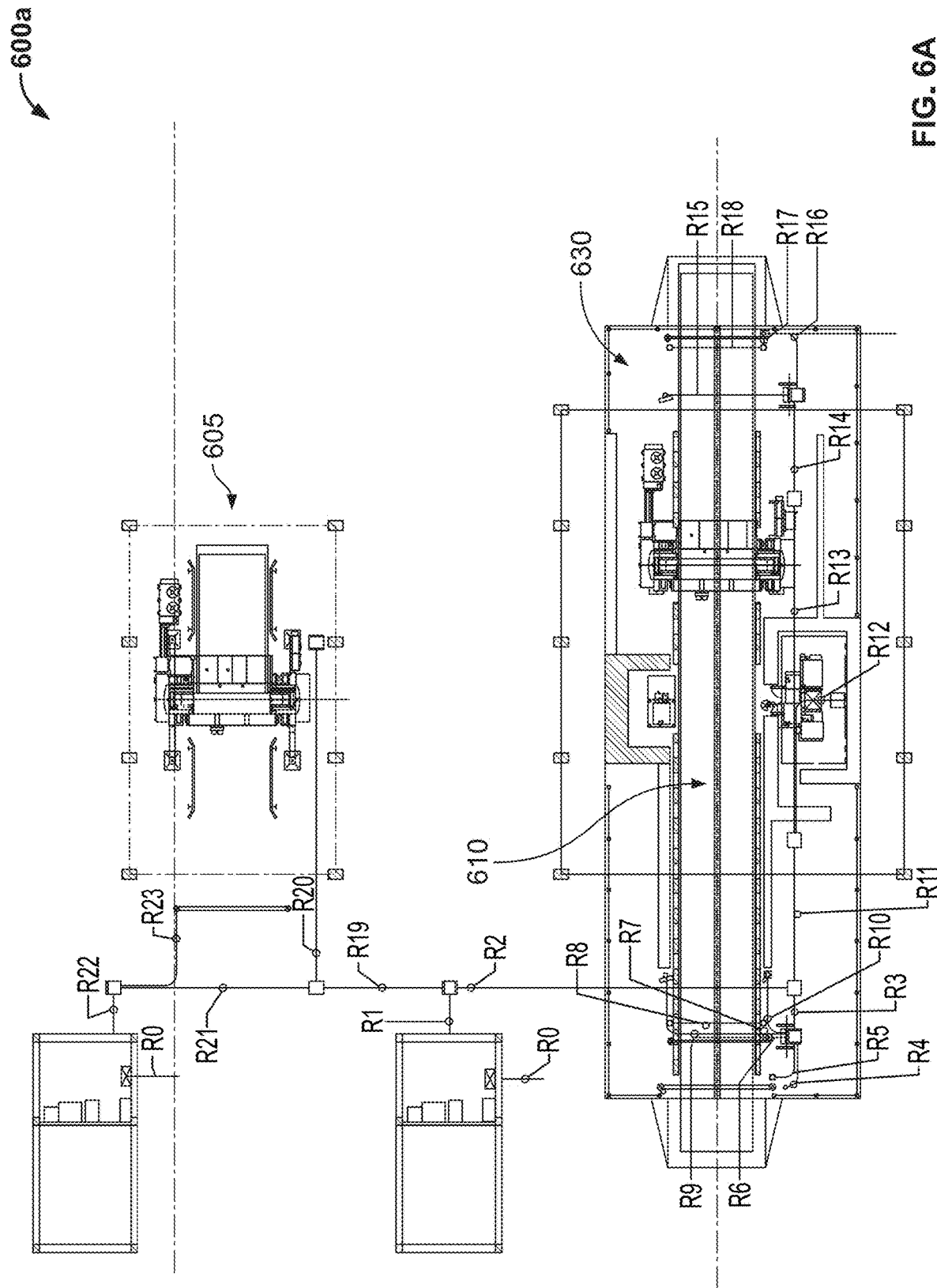

SYSTEMS AND METHODS FOR ELIMINATING CROSS-TALK SIGNALS IN ONE OR MORE SCANNING SYSTEMS HAVING MULTIPLE X-RAY SOURCES

CROSS-REFERENCE

The present application is a continuation application of U.S. patent application Ser. No. 17/652,264, titled "Systems and Methods for Eliminating Cross-Talk Signals in One or More Scanning Systems Having Multiple X-Ray Sources" and filed on Feb. 23, 2022, which relies on, for priority, U.S. Patent Provisional Application No. 63/152,721, of the same title and filed on Feb. 23, 2021, both of which are herein incorporated by reference in their entirety.

FIELD

The present specification relates generally to the field of X-ray scanning systems. More specifically, the present specification provides systems and methods for eliminating unwanted interference, often referred to as crosstalk, between co-located X-ray scanners, X-ray systems, proximate passive radiation portal monitors, or any system having multiple X-ray sources.

BACKGROUND

Many conventional X-ray scanning systems include one or more low-energy (LE) X-ray scanning systems with operational energies ranging from 120 KeV to 750 KeV. These systems typically generate scan images using a time-multiplexing detection method, where X-ray data is continually collected throughout the duration of a scan. Further, conventional X-ray scanning systems may include one or more passive Gamma/Neutron radiation portal monitors (RPM) which also capture data continuously—recording background data when the scan zone is unoccupied and recording live data when the object under investigation passes the detection panel.

In some operational X-ray system scenarios, such as portal-based systems, gantry-based systems or mobile systems, one or more high-energy (HE) X-ray transmission scanning systems are configured to operate proximate to, but independently of, the LE X-ray scanning system (backscatter system) and RPM scanning systems. Alternatively, the HE X-ray scanning system is coupled directly to an LE X-ray backscatter or RPM scanning sub-system, as part of a "co-located" product.

HE X-ray scanning systems typically comprise X-ray sources, such as a cyclic particle accelerator (Betatron) or a linear particle accelerator (LINAC), with operational energies ranging from 750 KeV to 10 MeV. The detectors employed in both LE X-ray backscatter systems and RPMs are sensitive to these higher-energy X-rays. As a result, for both HE and LE X-ray scanning units, and RPM sub-systems, operating in close proximity, such as less than a physical separation of 1000 meters, there is a high probability that high-energy X-rays will be observed in the low-energy backscatter image or contribute towards the measured signal in an RPM sub-system. HE X-ray based scanning platforms are typically operated in a pulsed mode, with each X-ray pulse having a duration of approximately 4 microseconds (µs). Additionally, HE X-ray sources such as LINACs can operate at pulse repetition frequencies up to several kilohertz. By way of example, the sources may operate at 1 kHz which would result in a high-energy X-ray pulse every 1 ms.

As a result of this HE X-ray pulse, closely located LE X-ray backscatter and RPM sub-systems can register an unwanted contribution towards their intrinsic measurement signal resulting in corrupted data, incorrectly computed results, and/or image degradation. Specifically, backscatter imaging systems, operating with a typical data capture window time per-pixel of 10 microseconds, may display a brightened pixel, or series of bright pixels depending upon the decay characteristics of the backscatter detector material and data acquisition configuration. Similarly, RPM systems may detect a higher-than-expected signal count(s), which may breach a set intensity threshold for alarm.

In cases where there are only a few HE X-ray transmission system(s) located in close proximity to the LE X-ray backscatter and RPM subsystems, and if the HE X-ray dose-per-pulse or pulse intensity is high, then conventional 'above-threshold-level' pulse removal or filtering techniques can be employed to identify the unwanted signal and remove the data from the resulting image or intensity calculation. This can be handled without knowledge or consideration of the X-ray system timing properties.

In cases where there are multiple HE X-ray transmission systems located at various distances relative to and/or proximate to LE X-ray and/or RPM imaging sub-systems, possibly operating with differing X-ray dose outputs through dynamic-dose modulation techniques or low-dose "personnel" imaging methodologies, then the unwanted detected crosstalk signal(s) may become undistinguishable from that expected on a LE X-ray backscatter or RPM imaging sub-system. At the same time, if each HE X-ray transmission system is pulsing asynchronously at a different pulse repetition frequency (PRF) then this would result in a large number of unwanted interference patterns received by the LE X-ray and/or RPM detector(s), thereby significantly increasing the difficulty with which the unwanted signal can be removed and, as a result, reducing the overall detection efficiency of the LE X-ray backscatter and RPM imaging sub-system(s). Unfortunately, in these cases, an 'above-threshold-level' pulse removal or filtering technique applied to the backscatter detection and RPM detection data, when the systems are operating in proximity to one or more high-energy systems, cannot be relied upon because the magnitude of the crosstalk signal varies depending upon which of the potentially several HE X-ray transmission systems are firing X-rays, the dose output of each system, and their relative physical locations.

Therefore, there is a need for systems and methods that efficiently remove HE X-ray crosstalk or interference signals, generated by one or more HE X-ray scanning systems, from images obtained in LE X-ray backscatter scanning systems and data captured in RPM imaging sub-systems that operate in proximity to the one or more HE X-ray scanning systems.

There is also a need for systems and methods for removing crosstalk by enabling a LE X-ray backscatter or RPM imaging sub-system to recognize, or determine when, the HE X-ray systems are firing X-rays so that the LE X-ray backscatter system and/or RPM imaging sub-system can efficiently remove the unwanted high-energy signals which, given distance and other attenuating factors, may not appear too different than expected signals.

Additionally, there is a need to align the pulse repetition frequency of multiple HE X-ray scanning systems sources with a common operating frequency. The resultant alignment of HE X-ray pulses reduces the effective unwanted detection rate and/or number of interference patterns of the crosstalk signal at other adjacent imaging systems, ensuring that they maintain a minimum detection performance and operational efficiency.

SUMMARY

The following embodiments and aspects thereof are described and illustrated in conjunction with systems, tools, and methods, which are meant to be exemplary and illustrative, and not limiting in scope. The present application discloses numerous embodiments.

The present specification discloses a system for eliminating X-ray crosstalk between a plurality of X-ray scanning systems having at least one high-energy X-ray source and at least one low-energy X-ray scanning system, the system comprising: a frequency generator configured to generate a common operational frequency; the at least one high-energy X-ray source coupled with the frequency generator, wherein the at least one high-energy X-ray source comprises a first processing module for receiving the common operational frequency and configured to generate a pulse repetition frequency of the least one high-energy X-ray source in order to be synchronous with the common operational frequency; and the at least one low-energy X-ray scanning system coupled with the frequency generator for receiving the common operational frequency, wherein the at least one low-energy X-ray scanning system comprises a second processing module configured to remove data associated with the common operational frequency at a first instance of time if the at least one high-energy X-ray source has emitted X-rays at the first instance of time.

Optionally, the system further comprises at least one radiation portal monitor coupled with the frequency generator for receiving the common operational frequency, wherein the at least one radiation portal monitor comprises a third processing module configured to remove data associated with the common operational frequency at a second instance of time if the at least one high-energy X-ray system has emitted X-rays at the second instance of time. Optionally, the system further comprises a radiation portal monitor (RPM), wherein the RPM comprises a passive radiation detector to detect and measure radiation emitted by radioactive materials in the absence of any stimuli, and wherein the RPM is either a fixed location scanning system or a portable scanning system.

Optionally, the system further comprises a high-energy X-ray scanning system comprising the at least one high-energy X-ray source, wherein the at least one high-energy X-ray source is a linear accelerator, and wherein the high-energy X-ray scanning system is either a fixed location scanning system or a portable scanning system.

Optionally, the system further comprises an X-ray backscatter scanning system, wherein the X-ray backscatter scanning system comprises the at least one low-energy X-ray source, and wherein the low-energy X-ray scanning system is either a fixed location scanning system or a portable scanning system.

Optionally, the at least one high-energy X-ray source is a linear accelerator and the at least one high-energy X-ray source is adapted to synchronize a pulse repetition frequency (PRF) of the linear accelerator to the common operational frequency.

Optionally, the at least one high-energy X-ray source and the at least one low energy X-ray scanning system are located within a predefined distance of each other. Optionally, the predefined distance is 1000 meters or less.

Optionally, the at least one high-energy X-ray source and at least one RPM system are located within a predefined distance of each other. Optionally, the predefined distance is 1000 meters or less.

Optionally, the at least one high-energy X-ray source comprises transmission system linear accelerator control and data capture electronics and data distribution hardware.

Optionally, the at least one low-energy X-ray source comprises data distribution hardware and backscatter system data capture electronics.

The present specification also discloses a method for eliminating crosstalk between a plurality of X-ray scanning systems having at least one high-energy X-ray source and at least one low-energy X-ray system, the method comprising: using a frequency generator to generate a common operational frequency; communicating, the common operational frequency to the at least one high-energy X-ray source; synchronizing the pulse-repetition frequency of the high-energy X-ray source with the common operational frequency; communicating the common operational frequency to at least one low-energy X-ray scanning system; and using the common operational frequency to remove crosstalk data associated with the at least one high-energy X-ray source from scan data captured by the at least one low-energy X-ray system.

Optionally, the method further comprises communicating the common operational frequency to at least one passive radiation detection system. Optionally, the method further comprises using the common operational frequency to remove crosstalk data associated with the at least one high-energy X-ray source from scan data captured by the at least one passive radiation detection system. Optionally, the at least one high-energy X-ray scanning system and the at least one passive radiation detection system are located within a predefined distance of each other. Optionally, the predefined distance is 1000 meters or less.

Optionally, the method further comprises synthesizing individual high-energy X-ray pulse repetition frequency values that are synchronized to both integer and non-integer divisions of the common operational frequency.

Optionally, the method further comprises removing unwanted signal associated with crosstalk data corresponding to the common operational frequency from an image generated by a low-energy X-ray scanning system comprising the at least one low-energy X-ray source.

Optionally, the at least one high-energy X-ray source comprises a linear accelerator.

Optionally, the at least one low-energy X-ray source is integrated into a X-ray backscatter scanning system.

Optionally, the at least one high-energy X-ray source and the at least one low energy X-ray source are located within a predefined distance of each other. Optionally, the predefined distance is 1000 meters or less.

Optionally, the method further comprises modulating the pulse repetition frequency of the at least one high-energy X-ray source in order to accommodate at least one of a varying speed of an object being scanned as it passes through a portal system or a speed of the at least one high-energy X-ray source moving along rails of a gantry system.

In some embodiments, the present specification also discloses a system for eliminating X-ray crosstalk between a plurality of X-ray scanning systems having at least one high-energy X-ray source and at least one low-energy X-ray scanning system or RPM, the system comprising: a frequency generator configured to generate a common operational frequency; the at least one high-energy X-ray source coupled with the frequency generator for receiving the common operational frequency, wherein the at least one high-energy X-ray source comprises a first processing module configured to modify a pulse repetition frequency of the at least one high-energy X-ray source in order to synchronize with the common operational frequency; and the at least one low-energy X-ray scanning system coupled with the master frequency generator for receiving the common operational frequency, wherein the at least one low-energy X-ray system comprises a second processing module configured to remove data associated with crosstalk interference received at a first instance of time if the at least one high-energy X-ray source has emitted X-rays at the first instance of time.

Optionally, the system further comprises at least one passive radiation detector coupled with the frequency generator, wherein the at least one passive radiation detector is configured to receive the common operational frequency, and wherein the at least one passive radiation detector comprises a third processing module configured to remove data associated with the common operational frequency at a second instance of time if the at least one high-energy X-ray system has emitted X-rays at the second instance of time.

Optionally, the system comprises a Radiation Portal Monitor (RPM), wherein the RPM comprises the passive radiation detector and wherein the RPM is either a fixed location scanning system or a portable scanning system.

Optionally, the system further comprises a high-energy X-ray scanning system comprising the at least one high-energy X-ray source, wherein the at least one high-energy X-ray source is a linear accelerator, and wherein the high-energy X-ray scanning system is either a fixed location scanning system or a portable scanning system.

Optionally, the system further comprises an X-ray backscatter scanning system, wherein the X-ray backscatter scanning system comprises the at least one low-energy X-ray source, and wherein the low-energy X-ray scanning system is either a fixed location scanning system or a portable scanning system.

Optionally, the at least one high-energy X-ray source is a linear accelerator and wherein the at least one high-energy X-ray source is adapted to synchronize a pulse repetition frequency (PRF) of the linear accelerator to the common operational frequency.

Optionally, the common operational frequency is used to mitigate X-ray crosstalk in the X-ray backscatter scanning system. Optionally, the common operational frequency is used to mitigate X-ray crosstalk in the RPM.

Optionally, the at least one high-energy X-ray source and the at least one low energy X-ray scanning system are located within a predefined distance of each other. Optionally, the predefined distance is 1000 meters or less.

Optionally, the at least one high-energy X-ray scanning system and at least one RPM system are located within a predefined distance of each other.

Optionally, the predefined distance is 1000 meters or less.

Optionally, the at least one high-energy X-ray scanning system and the at least one low-energy X-ray scanning system are coupled with the master frequency generator by using any one or a combination of electrical, fiber-optic or wireless communication systems.

Optionally, the at least one high-energy X-ray scanning system and the at least one RPM system are coupled with the master frequency generator by using any one or a combination of electrical, fiber-optic or wireless communication systems.

Optionally, the at least one high-energy X-ray source comprises transmission system linear accelerator control and data capture electronics and data distribution hardware.

Optionally, the at least one low-energy X-ray scanning system comprises data distribution hardware and backscatter system data capture electronics.

Optionally, the at least one RPM system comprises data distribution hardware and RPM system data capture electronics.

In some embodiments, the present specification describes a method for eliminating crosstalk between a plurality of X-ray scanning systems having at least one high-energy X-ray source and at least one low-energy X-ray scanning system, the method comprising: using a frequency generator to generate a common operational frequency; communicating, the common operational frequency to the at least one high-energy X-ray source; synchronizing the pulse-repetition frequency of the high-energy X-ray source with the common operational frequency; communicating the common operational frequency to at least one low-energy X-ray scanning system; and using the common operational frequency to remove crosstalk data associated with the at least one high-energy X-ray source from scan data captured by the at least one low-energy X-ray system.

Optionally, the method further comprises modulation of the pulse repetition frequency of the at least one high-energy X-ray source in order to accommodate different imaging scenario's, such as varying speed of the object being scanned as it passes through a Portal System, or the speed of the high-energy X-ray source moving along the rails of a Gantry System.

Optionally, said communicating is effectuated via fiber-optic cables.

Optionally, the method further comprises communicating the common operational frequency to at least one passive radiation detection system.

Optionally, the method further comprises using the common operational frequency to remove crosstalk data associated with the at least one high-energy X-ray source from scan data captured by the at least one passive radiation detection system.

Optionally, the at least one high-energy X-ray scanning system and the at least one passive radiation detection system are located within a predefined distance of each other. Optionally, the predefined distance is 1000 meters or less.

Optionally, the method further comprises synthesizing individual high-energy X-ray pulse repetition frequency values that are synchronized to both integer and non-integer divisions of the common operational frequency.

Optionally, the method further comprises removing unwanted signal associated with crosstalk data corresponding to the common operational frequency from an image generated by a low-energy X-ray scanning system comprising the at least one low-energy X-ray source.

Optionally, the at least one high-energy X-ray source comprises a linear accelerator.

Optionally, the at least one low-energy X-ray source is integrated into a X-ray backscatter scanning system.

Optionally, the at least one high-energy X-ray source and the at least one low energy X-ray source are located within a predefined distance of each other. Optionally, the predefined distance is 1000 meters or less.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 1D is a schematic top-view representation of the inspection system shown in FIG. 1C;

FIG. 1E illustrates an example of an X-ray backscatter system 150 that may be deployed under a vehicle for under-chassis inspection, which may be used with the methods and systems described in the present specification in an embodiment;

FIG. 1F illustrates another view of the X-ray backscatter system 150 shown in FIG. 1E;

FIG. 3A provides a visual representation of the relationship between multiple differing individual high-energy X-ray source pulse repetition frequencies and a common operational frequency, in accordance with an embodiment of the present specification;

FIG. 6A illustrates an exemplary system deployment scenario, in accordance with an embodiment of the present specification;

DETAILED DESCRIPTION

Figure 1A:
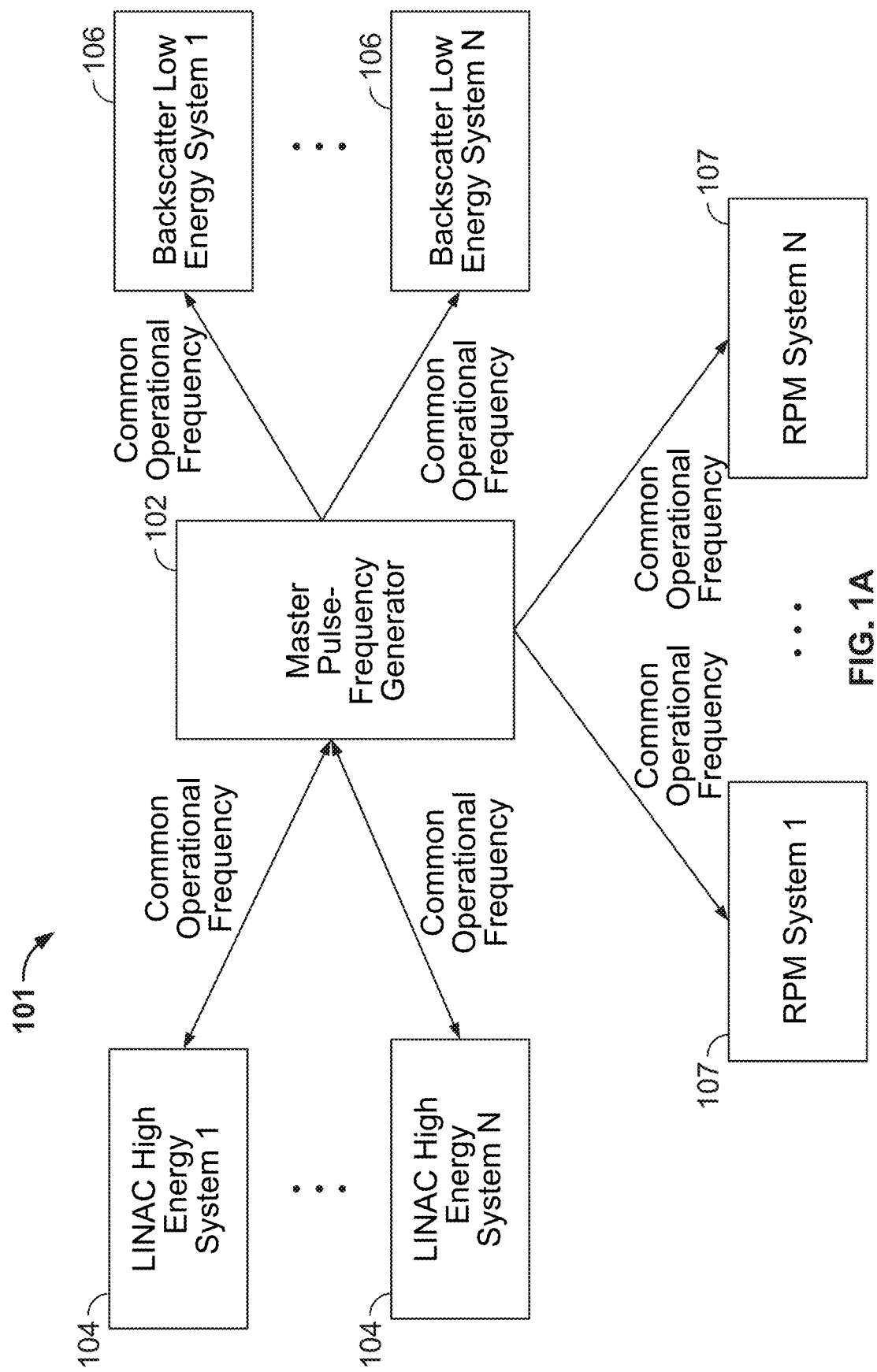
FIG. 1A is a block diagram of a crosstalk removal system, in accordance with an embodiment of the present specification.

In an embodiment, the present specification provides a system and method for removal of X-ray crosstalk between high-energy X-rays scanning platforms such as linear accelerator X-ray (LINAC) based scanning systems and low-energy X-ray backscatter scanning systems or radiation portal monitors (RPMs). In various embodiments, RPMs comprise passive radiation detector equipment designed to detect and measure radiation emitted by radioactive materials in the absence of any stimuli.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. In addition, the terminology and phraseology used is for the purpose of describing exemplary embodiments and should not be considered limiting. Thus, the present invention is to be accorded the widest scope encompassing numerous alternatives, modifications, and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

In various embodiments, the system, particularly each of the modules, components, or generators described herein, includes at least one processor capable of processing programmatic instructions, has a memory capable of storing programmatic instructions, and employs software comprised of a plurality of programmatic instructions for performing the processes described herein. In various embodiments, a computing device may be employed to receive and process data signals and image data and may include an input/output controller, at least one communication interface and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures. In embodiments, the computing device is capable of executing programmatic instructions. In some embodiments, execution of a plurality of sequences of programmatic instructions or code, which are stored in one or more non-volatile memories, enable or cause the CPU of the computing device to perform or enable various functions, processes and algorithms, such as, for example, performing image reconstruction for display on a screen. In alternate embodiments, hard-wired circuitry may be used in place of, or in combination with, software instructions for implementation of the processes of systems and methods described in this application. In some embodiments, one or more programmable embedded microcontroller and FPGA (Field Programmable Gate Array) based circuit boards may be used in place of, or in combination with, software instructions for implementation of the processes of systems and methods described in this application. Thus, the systems and methods described are not limited to any specific combination of hardware and software.

It should further be appreciated that each device may have wireless and/or wired receivers and transmitters capable of sending and transmitting data, at least one processor capable of processing programmatic instructions, memory capable of storing programmatic instructions, and software comprised of a plurality of programmatic instructions for performing the processes described herein.

As used herein, the term "crosstalk" refers to the unwanted detection, in a first system (such as a low-energy backscatter X-ray system or RPM imaging sub-system), of X-ray signals generated by a second system (such as a high-energy LINAC system).

A low-energy (LE) X-ray scanning system is defined as an X-ray scanning system having an X-ray source that operates at energies ranging from 120 KeV to 750 KeV. A high-energy (HE) X-ray scanning system is defined as an X-ray scanning system having an X-ray source that operates at energies ranging from 750 KeV to 10 MeV.

It should further be appreciated that, in a preferred embodiment, the presently disclosed inventions are only implemented when more than 1 HE X-ray source is operated within 1000 meters of a LE X-ray source and/or RPM imaging sub-system and where the HE X-ray sources are pulsing asynchronously, have differing X-ray dose outputs, or implement low-dose "personnel" imaging methodologies.

FIG. 1A is a block diagram of a crosstalk removal system 101, in accordance with an embodiment of the present specification. The system 101 comprises a master pulse-frequency generator 102 which, in some embodiments, is configured to generate a common operational frequency and synchronize a plurality of LINAC-based high-energy X-ray inspection systems 104 (1 to n) to the common operational frequency. The master pulse-frequency generator 102 is further configured to communicate the common operational frequency to a plurality of low-energy X-ray backscatter systems 106 (1 to n) and optionally, a plurality of RPM imaging sub-systems 107 (1 to n) for removal of X-ray crosstalk. Thus, in embodiments, the plurality of LINAC-based high-energy X-ray inspection systems 104 (1 to n), the plurality of low-energy X-ray backscatter systems 106 (1 to n) and the plurality of RPM imaging sub-systems 107 (1 to n) are coupled (using any one or a combination of electrical, fiber-optic or wireless communication systems) with the master pulse-frequency generator 102 and configured to receive the common operational frequency.

In embodiments, a range of the LINAC pulse repetition frequencies (PRFs) can be generated based upon the common operational frequency. Thus, each of the range of PRFs of the LINAC is synchronized to the common operational frequency. In some embodiments, each of the plurality of LINAC-based high-energy X-ray inspection systems 104 (1 to n) includes a processing module configured to modify or generate a PRF of each of the plurality of high-energy X-ray inspection systems in order to synchronize with the common operational frequency. In embodiments, an electronic subsystem of the LINAC (of each of the high-energy X-ray inspection systems 104 (1 to n)) is configured to determine whether the common operational frequency should be received in order to synchronize the PRF. Accordingly, each of the X-ray sources has an independently operating processing module adapted to establish a set of pulse frequencies and, separate therefrom, is in data communication with a single frequency generator configured to generate a common operational frequency.

It should be appreciated that, in various embodiments, the master pulse-frequency generator 102 is physically separate or distinct from a frequency generator that is typically intrinsic to and integrated into the LINAC of each of the plurality of LINAC-based high-energy X-ray inspection systems 104 (1 to n).

In some embodiments, each of the plurality of low-energy X-ray backscatter systems 106 (1 to n) includes a processing module configured to remove data associated with the common operational frequency at an instance of time, T, if any of the high-energy X-ray inspection systems has emitted X-rays at the instance of time, T.

In some embodiments, each of the plurality of RPM imaging sub-systems (1 to n) includes a processing module configured to remove data associated with the common operational frequency at an instance of time, t, if any of the high-energy X-ray system has emitted X-rays at that instance of time, t.

The systems and methods of the present specification may be used to remove crosstalk from backscatter, RPM, and multi-energy X-ray inspection systems such as those disclosed in U.S. Pat. Nos. 7,505,556; 7,218,704; 7,099,434; 9,841,386; 7,593,506; 7,400,701; 7,551,715; 7,924,979; 7,551,718; 8,345,819; 8,824,632; 8,532,823; 8,884,236; 8,903,045; 9,146,201; 9,535,019; 9,285,488; 9,659,343; 9,958,569; 9,841,386; 8,325,871; 8,993,970; and 7,555,099 all of which are incorporated herein by reference. In various embodiments, the systems and methods of the present specification may be employed in both static/fixed and mobile scanning systems/solutions and in wired or wireless configurations.

Figure 1B:
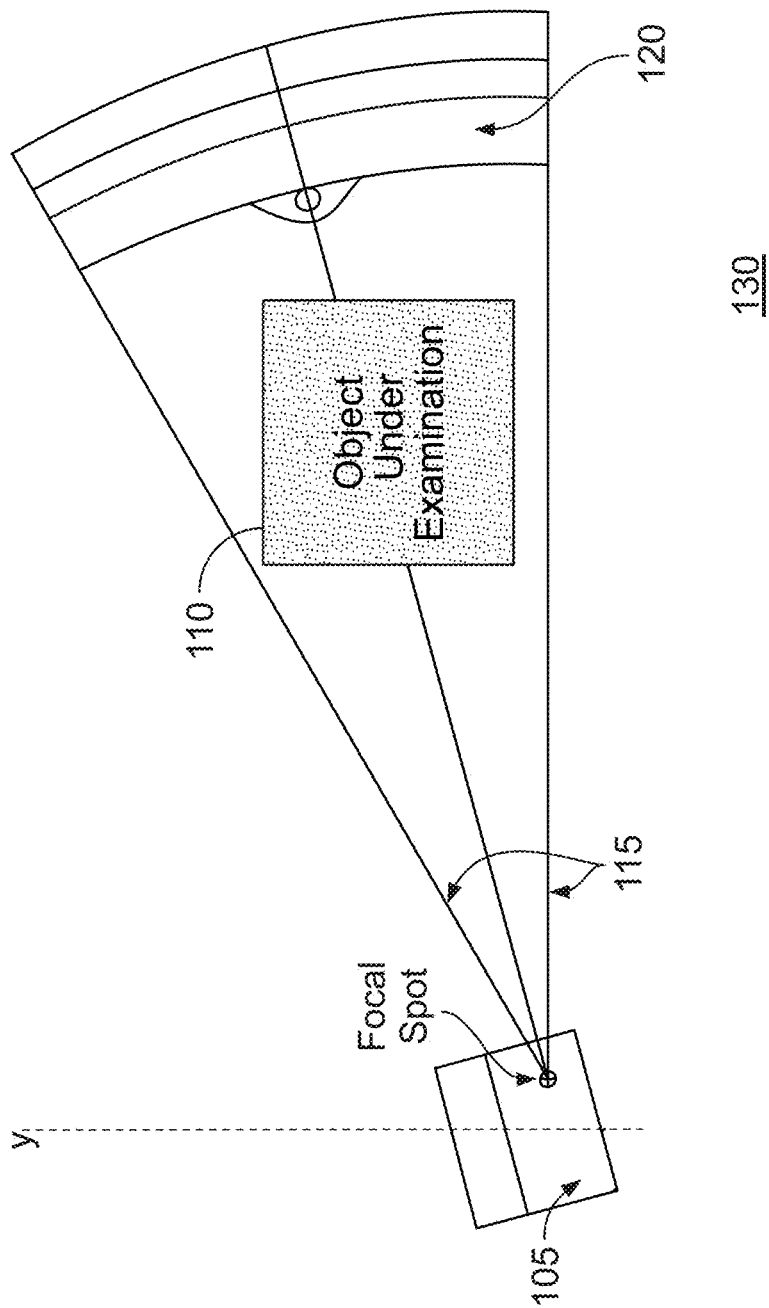
FIG. 1B illustrates an exemplary LINAC-based high-energy X-ray cargo inspection system that may be used with the methods and systems described in the present specification in an embodiment.

FIG. 1B illustrates an exemplary LINAC-based high-energy X-ray cargo inspection system that may be used with the methods and systems described in the present specification. As shown, the cargo inspection system 130 comprises a high-energy radiation source 105 for irradiating an object under inspection 110 with a vertically divergent fan beam of radiation 115. The high-energy radiation source 105 may be, but is not limited to, a linear accelerator (LINAC) or Betatron. In embodiments, the LINAC or any other source provides a radiation dose sufficient for imaging containers and cargo. In an embodiment, the energy and dose output of the LINAC or any other source ranges from 750 keV to 10 MeV and 0.07 Gy/min to 15 Gy/min respectively.

The choice of source type, its intensity, and energy output depends upon the sensitivity of the detectors, the radiographic density of the cargo in the space between the source and detectors, radiation safety considerations, and operational requirements, such as the inspection speed. One of ordinary skill in the art would appreciate the factors that need to be considered in order to select a radiation source type, depending upon inspection requirements. In one embodiment, where the object under inspection 110 is a large sized container or car that highly attenuates the X-ray beam, the radiation may be from an X-ray source operating at an energy ranging from approximately 750 keV and even up to 10 MeV or more. In an embodiment, the object under inspection 110 may be a vehicle, truck, rail car or other containers for carrying cargo, passenger luggage or general belongings.

The cargo inspection system 130 further comprises a detector array 120, which is preferably positioned behind the object under inspection 110 and is used to detect radiation transmitted through the object under inspection 110. The detectors 120 may be formed by a stack of crystals that generate analog signals when X-rays impinge upon them, with the signal strength proportional to the amount of beam attenuation in the object under inspection 110. In one embodiment, the X-ray beam detector arrangement consists of a linear array of solid-state detectors of the crystal-diode type. A typical arrangement uses cadmium tungstate scintillating crystals to absorb the X-rays transmitted through the object under inspection 110 and to convert the absorbed X-rays into photons of visible light. Crystals such as bismuth germinate, sodium iodide or other suitable crystals may be alternatively used as known to a person of ordinary skill in the art. The crystals can be directly coupled to a suitable detector, such as a photodiode or photo-multiplier. The detector photodiodes could be linearly arranged, which through unity-gain devices, provide advantages over photo-multipliers in terms of operating range, linearity and detector-to-detector matching. In another embodiment, an area detector is used as an alternative to linear array detectors. Such an area detector could be a scintillating strip, such as cesium iodide or other materials known in the art, viewed by a suitable camera or optically coupled to a charge-coupled device (CCD).

It would be apparent to persons of skill in the art that the cargo inspection system 130 shown in FIG. 1B is just one example of an inspection system employing high-energy X-ray sources such as, but not limited to LINAC or Betatron. The present specification provides a system and method for removing crosstalk among a plurality of different system configurations employing both high-energy X-ray sources, low-energy X-ray sources and passive radiation detection monitors.

Scatter imaging, in which the X-rays are scattered by a material (typically in a generally backward direction), offers several unique inspection capabilities and operational features. Scatter imaging allows images to be obtained even when the imaged object is accessible from only one side. Moreover, since the scatter signal falls off quite rapidly with increasing depth into the object, backscatter images effectively represent a "slice" of the object characteristic of the side nearest to the X-ray source, thereby reducing problems of image clutter that may confound transmission images. The Compton effect, which dominates X-ray scatter in the low energy range (120 keV to 750 keV), dominates the interaction of X-rays with dense low-atomic-number (low-Z) materials. Narcotic drugs tend to produce bright signatures in a backscatter image, as do organic explosives, making backscatter imaging a useful imaging modality for bomb or drug detection. Finally, alignment requirements of the X-ray beam with detectors or collimation devices are less exacting than for transmission imaging thereby enabling rapid deployment in a wide range of inspection scenarios.

Figure 1C:
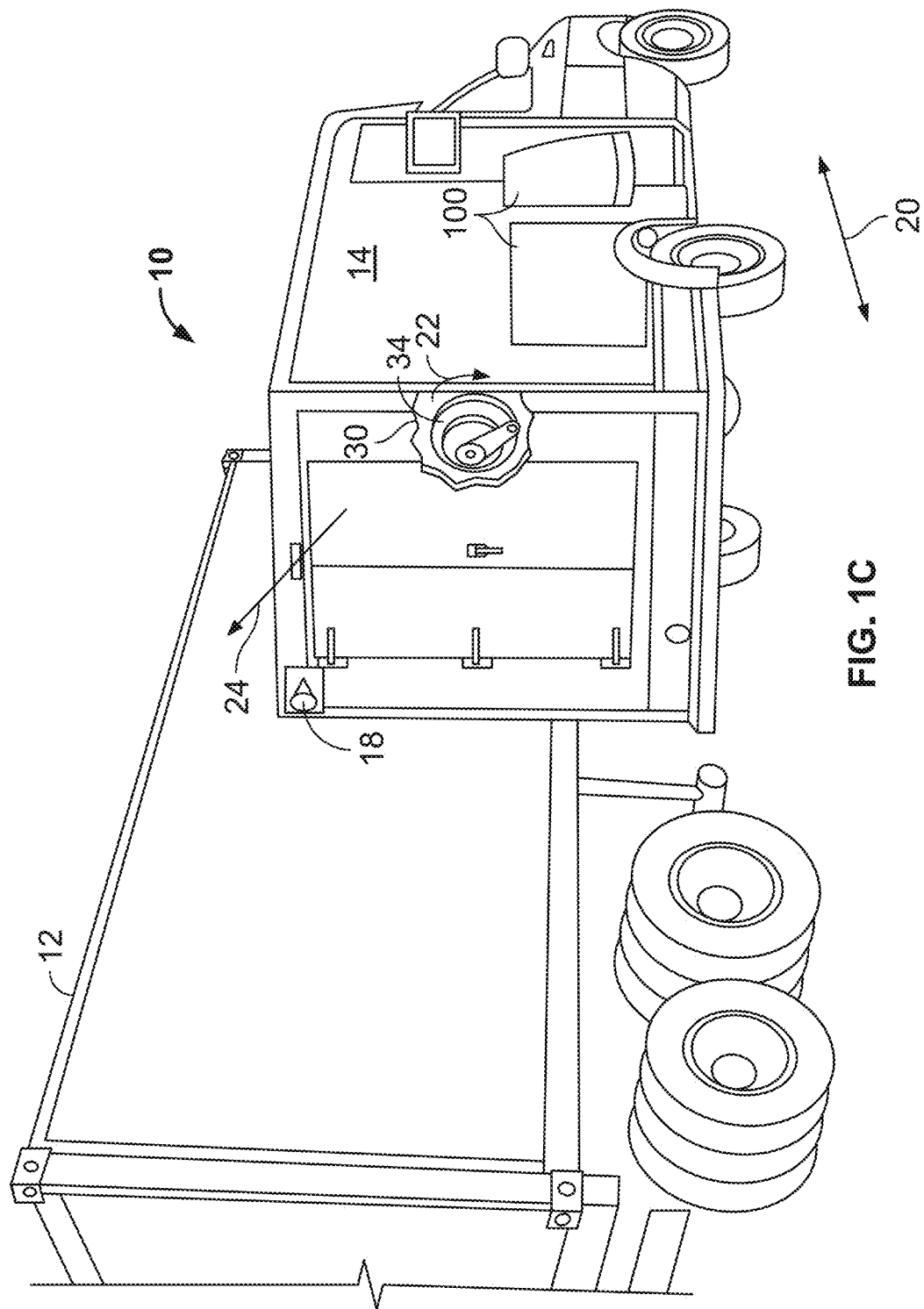
FIG. 1C illustrates an example of a low-energy X-ray backscatter cargo inspection system that may be used with the methods and systems described in the present specification in an embodiment.

FIG. 1C illustrates an example of a low-energy X-ray backscatter cargo inspection system. FIG. 1C is a break-away perspective view, of an X-ray backscatter mobile cargo inspection system deployed on a truck capable of on-road travel and scanning of an enclosure such as a vehicle or cargo container while one or both of the inspection system and enclosure are in motion. FIG. 1D is a schematic top-view representation of the inspection system shown in FIG. 1C. Referring to FIGS. 1C and 1D, X-ray backscatter detectors 100 are mounted on a mobile platform 10, or conveyance, typically capable of road travel, that traverses a large object to be inspected such as a vehicle or a cargo container 12. Conveyance 10 is characterized by an enclosure 14, here, the skin of a van, shown in FIG. 1C in a cut-away view, to enable depiction of other components of the inspection system. The conveyance 10 may have many alternate embodiments, including but not limited to gasoline, diesel, electric, propane, battery, fuel-cell, or hydrogen-powered motor vehicles (including vans, trucks, or similar), tracked vehicles, sleds, trailers, cranes, or other equipment that can be put into motion, preferably self-propelled, but also including vehicles tethered and pulled such as under electric power.

Contained within the enclosure 14 of conveyance 10 is a source 30 including X-ray tube 32 (shown in FIG. 1D) and chopper 34. Source energies are typically in a range of 120 keV to 750 keV, thus the chopper 34 may be smaller than employed in systems in which higher-energy X-rays are employed. Chopper 34 may be a rotating perforated hub, or a wheel with transmitting spokes, or any number of means, known in the art, for generation of flying spot beams that lie, typically, in a plane approximately orthogonal to the direction 20 of motion. The X-ray tube 32 depicted in FIG. 1D, by way of example, is a panoramic-style X-ray tube that is capable of wide-angle beam generation and additionally may be rotatable to allow scanning on either side of conveyance 10. Rotating hoop 34, with apertures 36 and 38, emits a pencil beam 24, thereby enabling inspection of objects, possibly on either side of the conveyance 10, herein referred to as "bilateral" inspection. However, all sources are encompassed within the scope of the present invention when employed in the manner described in the present description. The X-ray source 30 and detectors 100 may be oriented to permit scanning from the conveyance's "driver's side", "passenger's side", or both sides simultaneously. Various means are known in the art for mechanically or electronically sweeping a beam of penetrating radiation, including, for example, the rotating chopper wheel 34 depicted in FIG. 1D or electronic scanning is described in detail, for example, in U.S. Pat. No. 6,421,420, issued Jul. 16, 2002, which is incorporated herein by reference.

Backscatter detector modules 100 are carried by conveyance 10 and typically enclosed within enclosing body 14 and concealed from view from outside the conveyance 10. They may also be carried outside the conveyance 10 for particular applications within the scope of the present invention. Detector modules 100 contain detectors for detecting penetrating radiation from source 30 that has interacted with, and scattered from, contents of the inspected object 12. The source of scattering may be characterized as anomalous for the nature of the person or item being scanned. Thus, a person carrying explosives may be detected on the basis of locally enhanced X-ray scatter. A specified characteristic of the scatter, such as a localization or particular disposition with respect to the inspected object, may be ascertained in order to determine threat levels of the object.

The inspection of object 12 may be conducted by an operator disposed within conveyance 10, or, alternatively, by a remotely disposed operator. For inspection, object 12 may be maintained in a stationary condition, with conveyance 10 traversing the object along direction 20 (forwards or backwards), alternatively, inspection may be conducted while both conveyance 10 and inspected object 12 are in motion. In yet another mode, referred to as a "portal mode," the inspection system is stationary and the object of inspection is conveyed past the inspection system. Where the object of inspection is a person, the person may be required to walk past the conveyance 10 slowly, preferably in both directions, so that both sides of the person can be subjected to search. In a "stationary mode," both the inspection system and the object being scanned are stationary, and a vehicle-mounted X-ray scanning method, configured as a part of the inspection system itself, is employed to create in effect both horizontal and vertical scanning to generate a backscatter X-ray image. Such methods may include the use of an x-y translation stage, electronically-steered X-ray sources (as described, for example, in U.S. Pat. No. 6,421,420) or other means.

The relative motion of conveyance 10 and object 12 may be carefully controlled or may be monitored by sensor 18 which employs any of a variety of sensing methods, such as radar, ultrasound, or optical, including laser or LIDAR sensing, all provided as examples only, in order to sense the relative speed of conveyance 10 with respect to object 12. A signal provided by sensor 18 is employed by controller 40 in one or more of the following modalities: the vehicle speed may be regulated, or, alternatively, the pixel registration may be corrected to compensate for vehicle speed anomalies in order to produce aspect-ratio-correct, distortion-free, backscatter X-ray images. Relevant techniques include, but are not limited to: the use of high precision speed-sensing devices to accurately measure vehicle speed at low (0.5 to 10 mile-per-hour) ranges; the use of low-speed (0.5 to 10 mile-per-hour) electronic and/or software-based engine and/or transmission controls; and the use of custom vehicle drive-train gear designs, which simultaneously produce low vehicle scan speed while maintaining the capability of offering roadworthy speed ranges, up to at least 55 miles per hour. In an embodiment, the speed of conveyance 10 does not impact scan quality, as the rate of capture of scan data is fixed by a rotation speed of the chopper wheel 34. Hence, in embodiments, for a backscatter X ray inspection system as described in the present specification, pixel registration is corrected to remove any unwanted/corrupt data from the scan data by using the common operational frequency signal as described in the present specification. The common operational frequency signal is used to identify the corrupt data and then the artifact is removed by using one or more predefined image processing algorithms in a processing module as described herein.

FIG. 1E illustrates an example of an X-ray backscatter system 150 that may be deployed under a vehicle for under-chassis inspection. FIG. 1F illustrates another view of the X-ray backscatter system 150 shown in FIG. 1E. The inspection of the underside of vehicles by a portable X-ray backscattering system presents special problems. The road clearance of cars is not more than 8 inches and can be as little as 6 inches'. Fixed inspection systems, such as portals, can place a detector in the ground or the detector can be placed on the ground. An X-ray source (such as, for example, an X-ray tube) employed in the under-chassis backscatter system 150 may consist of an electromagnetic scanner 152 of an electron beam across an anode. Electromagnetic scanner 152 is driven by electronics module 154. The X-rays, generated by the source, are collimated by a linear array of apertures 156 that span, for example, 30 inches of the underside in one pass. The detectors 158 are mounted on each side of the X-ray tube so as to detect X-rays 160 backscattered from vehicle 162. Power supplies, pulse and image processors can be mounted appropriately. Chassis 164 of the backscatter inspection system 150 on wheels 166 may be adapted to be maneuvered under vehicle 162 by motor or manual control.

Figure 1G:
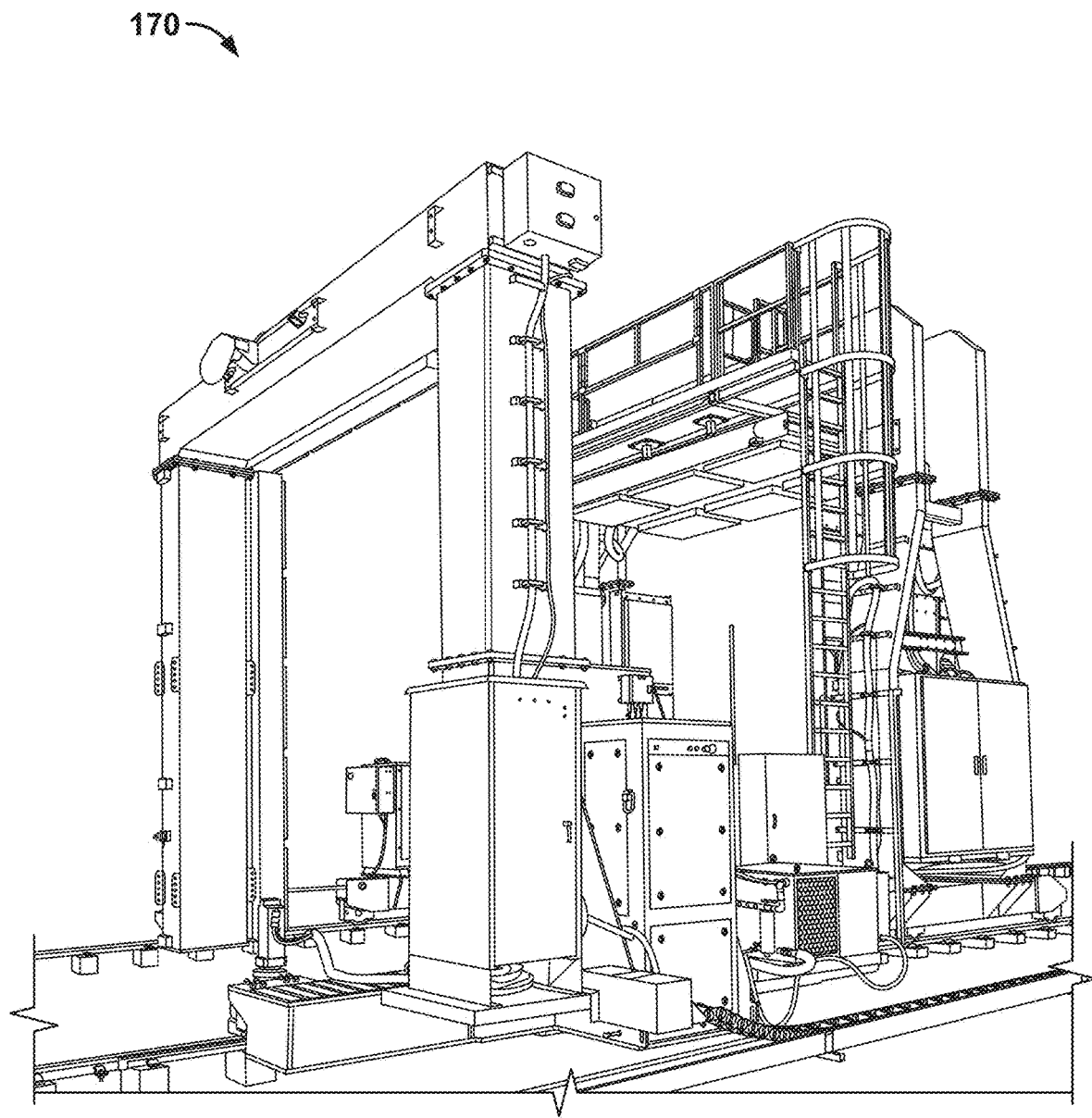
FIG. 1G shows a view of a co-located fixed site X-ray imaging system that combines both high-energy transmission and low-energy backscatter imaging within the same inspection platform, that may be used with the methods and systems described in the present specification in an embodiment.
Figure 1H:
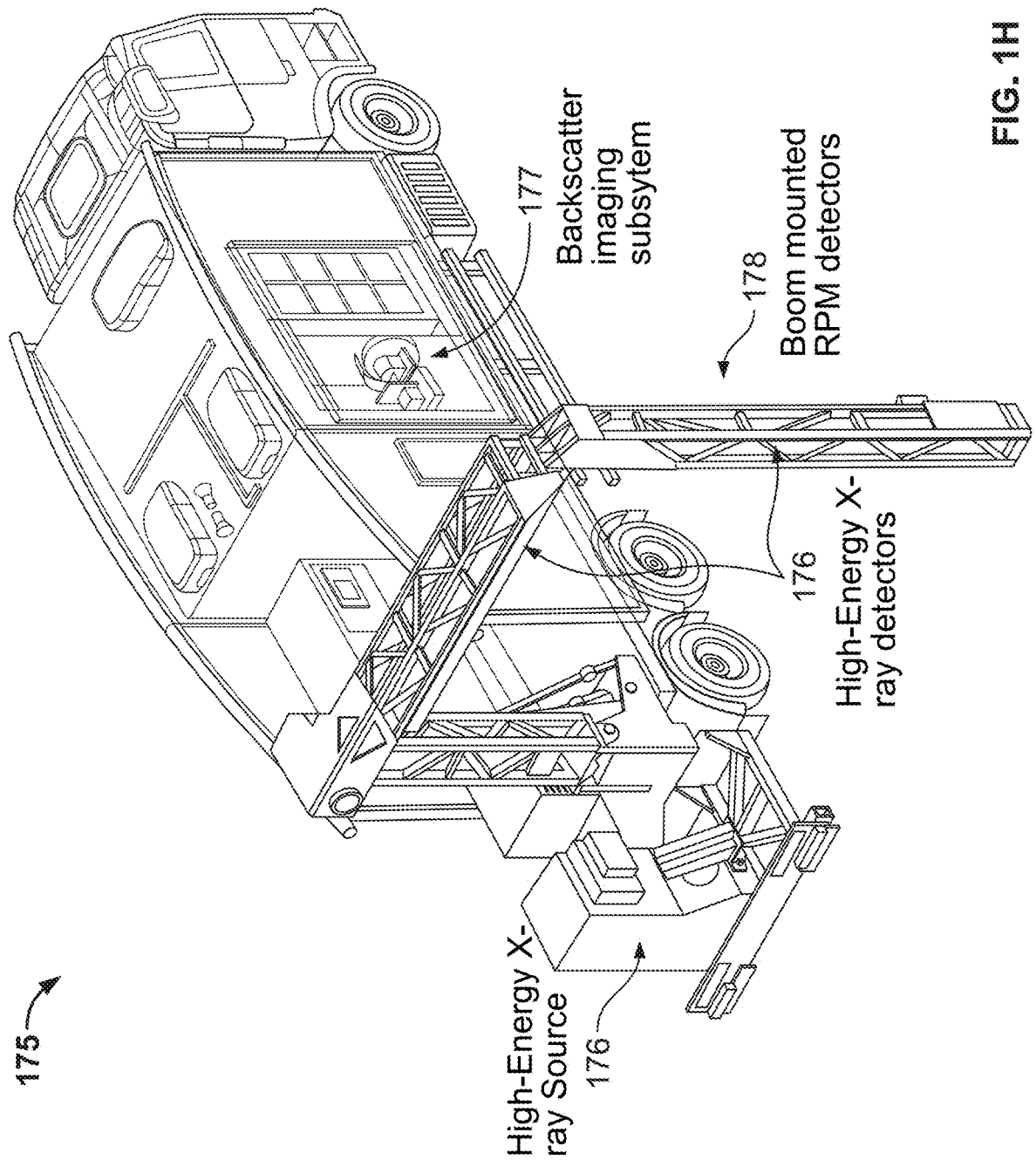
FIG. 1H shows a view of a mobile X-ray scanning system that combines a high-energy transmission imaging system, a low-energy backscatter imaging system and a passive radiation detection system within the same inspection platform which may be used with the methods and systems described in the present specification in an embodiment.
Figure 1I:
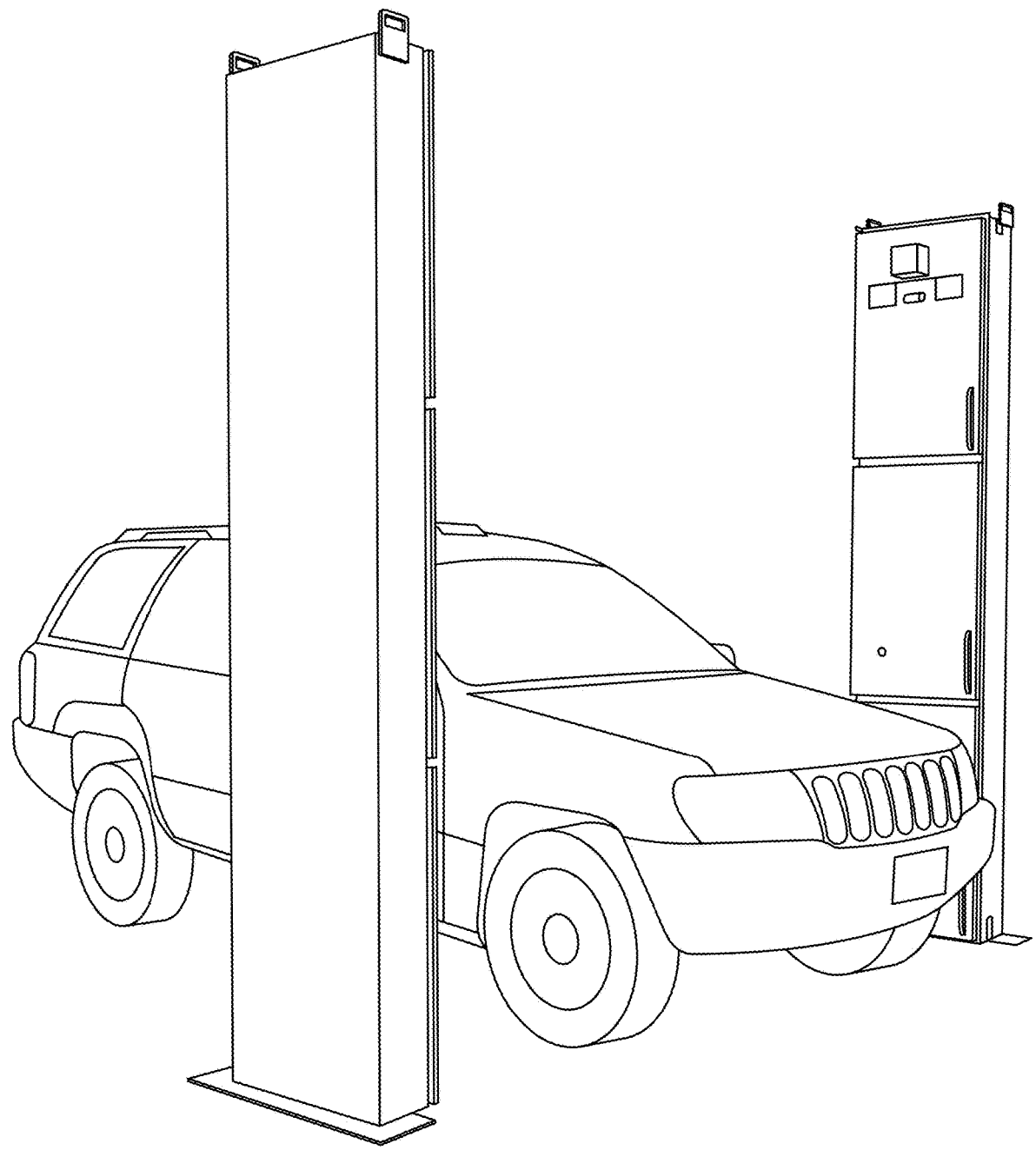
FIG. 1I shows a stand-alone fixed site passive gamma/neutron radiation portal monitor (RPM) solution that may be deployed in close proximity to a high-energy or low-energy X-ray imaging system.

FIG. 1G is a view of a co-located fixed site X-ray imaging system 170 that combines both high-energy transmission and low-energy backscatter imaging in the same inspection platform. FIG. 1H shows a view of a mobile X-ray scanning system 175 that combines a high-energy transmission imaging system 176, a low-energy backscatter imaging system 177, and a passive radiation detection system 178 within the same inspection platform. FIG. 1I shows a stand-alone fixed site passive gamma/neutron radiation portal monitor (RPM imaging sub-system) solution 180 that may be deployed in close proximity to a high-energy or low-energy X-ray imaging system.

Referring back to FIG. 1A, in embodiments, the plurality of LINAC-based high-energy X-ray inspection systems 104 are programmed to emit X-rays that are synchronous with the common operational frequency generated by the master pulse-frequency generator 102. Limiting the number of high-energy X-ray frequencies, by generating a common operational frequency, constrains the number of different interference patterns that may occur in the plurality of low-energy X-ray or RPM inspection systems 106, 107, to one. This also results in simplifying the crosstalk removal process due to the presence of a single, known interference pattern.

The common operational frequency signal generated by the master pulse-frequency generator 102 is also communicated to each of the plurality of low-energy X-ray backscatter inspection system 106, where, using image processing algorithms, a significant portion of crosstalk may be eliminated or removed from inspection images produced by each of the backscatter inspection system 106 when high-energy X-rays are present. By limiting crosstalk reduction to only when high-energy X-rays are present, unnecessary processing and/or corruption of backscatter scan images is eliminated, thus preventing image performance degradation and reduced detection capabilities.

In embodiments, in order to ensure that an overall image quality remains smooth and without sharp edges/distortions adjacent signal values are averaged. This method successfully removes all cross-talk within low-energy inspection systems. However, such removal of cross-talk may result in image quality deterioration in some regions of the images produced. For example, in case of a vehicle being scanned by a backscatter inspection system, anything in the vehicle generating a specific signal (equal to an interference pulse) may not be captured in the scanned image. However, as the frequency of interference pulses is low when compared to a data capture rate of the backscatter system, the interference pulses appear infrequently, and so the data loss is not significant. In an exemplary backscatter system having a sample rate of 10 ms per line, at 400 Hz pps, a corresponding LINAC operates for a 2 μs period every 25 ms, thereby only impacting one or two pixels. Hence, the data loss equals to a maximum of 2 pixels per 2500 data points (or 0.08%).

In an embodiment, the master pulse-frequency generator 102 becomes operational whenever two or more of the high-energy X-ray inspection systems 104 and low-energy X-ray inspection systems 106 located within a predefined distance of each other are operational. In embodiments where two or more of the high-energy X-ray inspection systems 104 and low-energy X-ray inspection systems 106 are co-located and form part of one screening system, the predefined distance between the systems 104, 106 may be as short as 5 meters (15 feet). In embodiments, in cases where two or more of the high-energy X-ray inspection systems 104 and low-energy X-ray inspection systems 106 are operating in series with respect to each other, but are decoupled (i.e. the scan tunnels of said systems are aligned but with a gap there-between), the predefined distance may be greater than approximately 33 meters or 1000 feet. In embodiments, in cases where two or more of the high-energy X-ray inspection systems 104 and low-energy X-ray inspection systems 106 are decoupled, offset and operating within shielding walls, the predefined distance may be less than 50 m (150 feet). Further, in embodiments, the predefined distance may increase based on a dose output of the high-energy X-ray inspection system 104. It should be noted that the distances mentioned above are exemplary and apply to portal-based systems. In the case of high-penetration gantry systems, the distances may be even greater in these configurations.

In some embodiments, fiber optic cables are configured to enable communication among the master pulse-frequency generator 102, the LINAC-based high-energy X-ray inspection systems 104, the low-energy X-ray backscatter systems 106 and the RPM sub-systems 107. As is known, fiber optic transmission offers greater bandwidth capabilities, long distance operation, higher security and better resistance to electromagnetic interference as compared to other means of transmission. In embodiments, as the individual X-ray inspection systems may be operating from different power-sources and may be located at various distances ranging up to meters from each other (as described above), the use of optical fiber communications provides seamless and fast operation of the system 101.

It should be appreciated that inspection systems such as, but not limited to, inspection systems with drive-through scan capability or occupied driver cab scan capability require sophisticated cross-talk removal techniques.

Figure 2A:
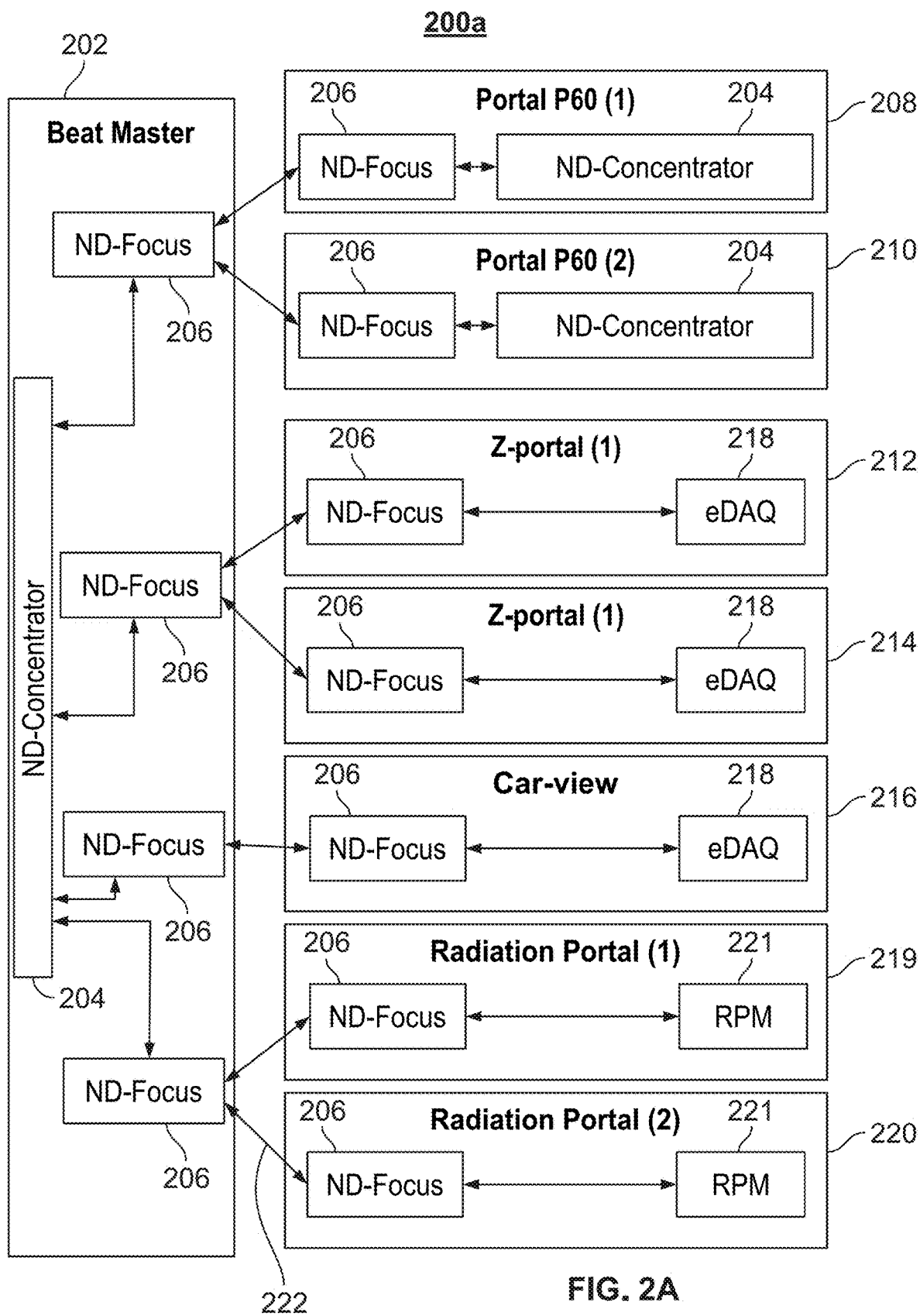
FIG. 2A illustrates a first implementation schematic of a crosstalk removal system, in accordance with an embodiment of the present specification.

FIG. 2A is a first implementation schematic diagram of a crosstalk removal system 200a, in accordance with an embodiment of the present specification. The system 200a comprises a BEAT_MASTER 202 (also referred to as a 'common operational frequency generation unit') that includes an ND-CONCENTRATOR 204 configured to operate as a master frequency generator along with a plurality of ND-FOCUS 206 to source a common operational frequency to the rest of the system 200a. In an embodiment, the ND-CONCENTRATOR 204 is configured as a programmable embedded microcontroller and FPGA-based circuit board that utilizes onboard crystal oscillators to generate timing signals. In an embodiment the ND-FOCUS 206 is an electronic board that is configured to communicate via fiber-optic cable and operate as both a source/master and sink/slave of the common operational frequency.

The system 200a also comprises two high-energy X-ray inspection systems 208 and 210, each of which, in an embodiment, comprises an ND-FOCUS 206 configured to receive the common operational frequency and configured to connect to one or more ND-CONCENTRATOR 204, which, in turn, is configured to operate as the transmission system control and data capture electronics and data distribution hardware. Additionally, the system 200a comprises three low-energy X-ray based backscatter X-ray inspection systems 212, 214 and 216, each of which, in an embodiment, comprises an ND-FOCUS 206 configured to receive the common operational frequency and to connect to one or more eDAQ (electronics data acquisition) backscatter signal processing sub-system 218. The system 200a further comprises two Radiation Portal Monitor (RPM) inspection systems 219 and 220, each of which, in an embodiment, comprises an ND-FOCUS 206 configured to receive the common operational frequency and to connect to the RPM detector processing electronics 221.

Additionally, a plurality of communication systems 222 allow the systems 208, 210, 212, 214, 216, 219 and 220 to be physically separated up to and beyond a distance of 1000 meters as necessary, providing low latency communication of the common operational frequency. In various embodiments, the communication systems 222 include any one or a combination of electrical, fiber-optic or wireless communication systems.

The common operational frequency generated by the common operational frequency generation unit, also referred to as the master pulse-frequency generator above or a beat master, 202 is communicated to each of the high-energy X-ray transmission inspection systems 208, 210 so that they are programmed to emit X-rays that are synchronous with the common operational frequency generated by the master pulse frequency generator. The common operational frequency generated by the beat master 202 is also communicated to each of the low-energy X-ray backscatter inspection systems 212, 214, 216, allowing the presence of crosstalk to be alleviated from inspection images produced by the backscatter systems 212, 214, 216 via the backscatter system data acquisition electronics 218 and image processing algorithms.

The common operational frequency generated by the beat master 202 is also communicated to each of the RPM sub-systems 219 and 220 allowing the presence of crosstalk to be mitigated using techniques such as blanking, to remove the contribution of the crosstalk signal in the measured RPM data. Thus, the system 200a is configured to have a separate beat master, 202 that communicates a common operational frequency to two proximate high-energy X-ray transmission systems 208, 210, three proximate low-energy X-ray backscatter systems 212, 214, 216, and two proximate RPM systems 219, 220.

Figure 2B:
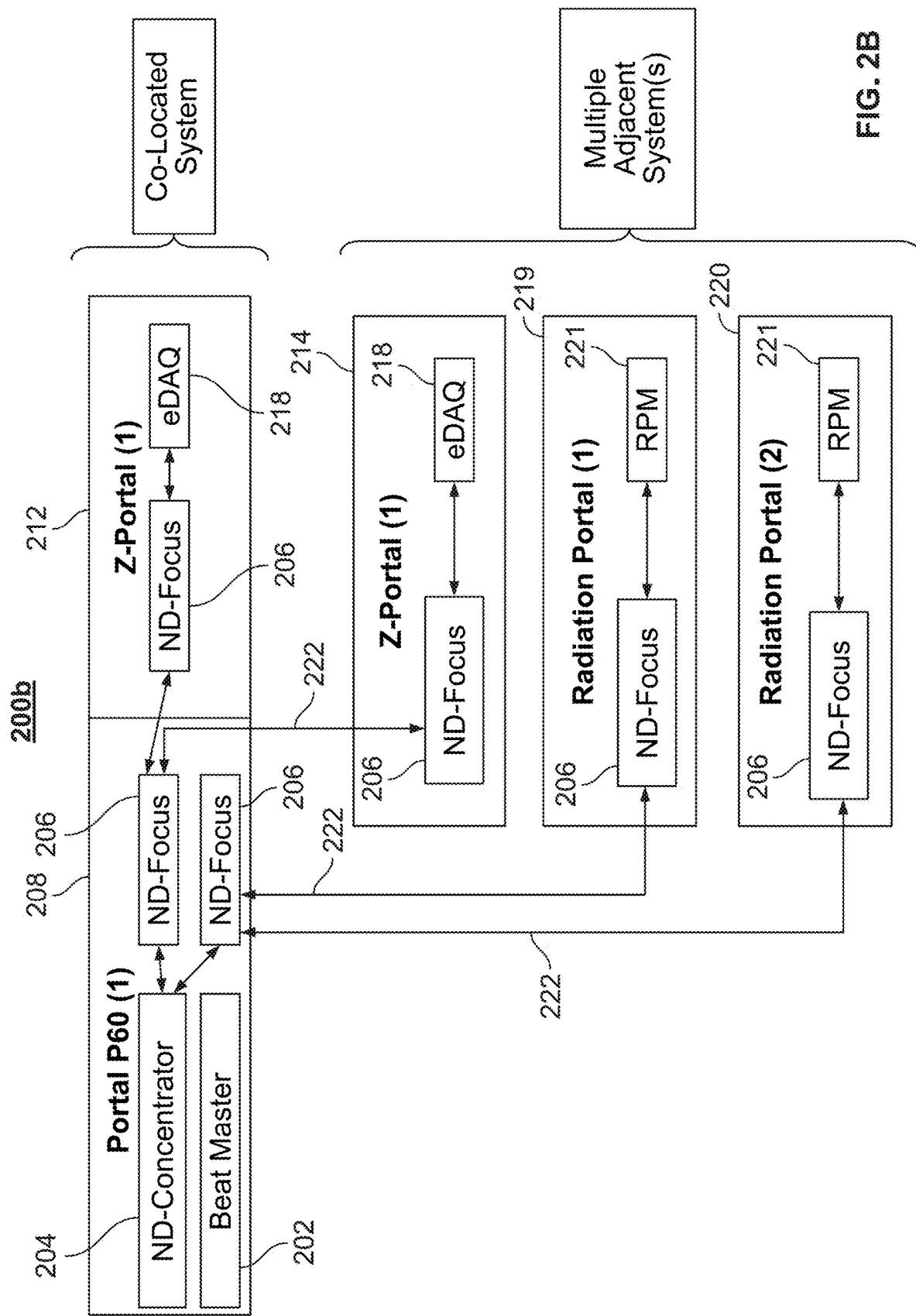
FIG. 2B is a schematic representation of a second implementation of a crosstalk removal system, in accordance with an embodiment of the present specification.

FIG. 2B is a schematic representation of a second implementation of a crosstalk removal system 200b, in accordance with an embodiment of the present specification. The system 200b is configured to have the high-energy X-ray transmission system 208 and the low-energy X-ray backscatter system 212 "co-located" which means that the two systems 208, 212 are integrated into a single screening solution. The system 208 is the only high-energy X-ray transmission system within the overall site and, as such, the BEAT_MASTER 202 is integrated "within" the high-energy X-ray transmission platform 208. The system 200b also features three separate inspection stations in close proximity comprising a low-energy X-ray backscatter unit 214 and two RPM units 219, 220 which receive the common operating frequency signal from the beat master 202 in the co-located system. Other elements such as the ND-CONCENTRATOR 204, ND-FOCUS 206, eDAQ (electronics data acquisition) backscatter signal processing sub-systems 218, RPM detector processing electronics 221 and communication systems 222 have been discussed earlier with reference to the system 200a.

Figure 2C:
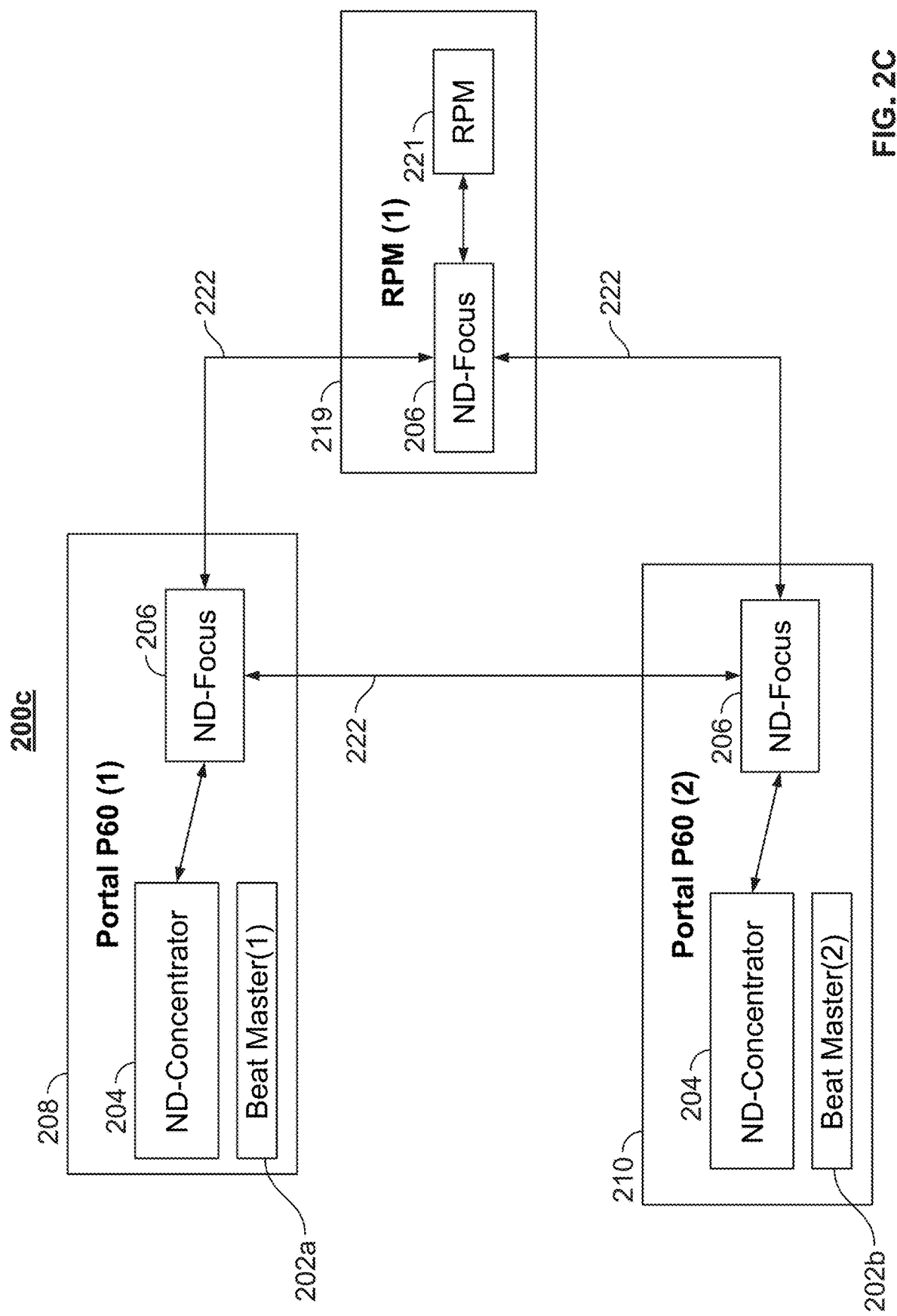
FIG. 2C is a schematic representation of a third implementation of a crosstalk removal system, in accordance with an embodiment of the present specification.

FIG. 2C is a schematic representation of a third implementation of a crosstalk removal system 200c, in accordance with an embodiment of the present specification. The system 200c is configured to have a first high-energy transmission system 208, proximate to a second high-energy X-ray transmission system 210, proximate to a standalone RPM unit 219. In embodiments, the use of a first beat master 202a and a second beat master 202b, both integrated within each respective high energy X-ray transmission systems 208, 210 is employed. If the first high-energy X-ray transmission system 208 is operational, then it adopts the role of master frequency generator and is configured to communicate the common operational frequency to the second high-energy X-ray transmission system 210 and the RPM unit 219 via the ND-FOCUS boards 206 and communication systems 222 (such as, but not limited to, fiber-optic cable connections). However, if the first high-energy X-ray transmission system 208 is not energized or operational, then the second high-energy X-ray transmission system 210 assumes the role of master frequency generator and is configured to communicate the common operational frequency to the first high-energy X-ray transmission system 208 via the ND-FOCUS boards 206 and communication systems 222. In this case the RPM unit 219 continues to receive the common operational frequency when either one, or both, of the first and second high-energy X-ray transmission systems 208, 210 are operational. Other elements such as the ND-CONCENTRATOR 204 and RPM detector processing electronics 221 have been discussed earlier with reference to the system 200a.

FIG. 3A provides a visual representation of the relationship between multiple differing individual high-energy X-ray source pulse repetition frequencies and a common operational frequency, in accordance with an embodiment of the present specification. FIG. 3A, shows a timing diagram 300 of the relationship between the common operational frequency and any individual high-energy X-ray source pulse repetition frequency. In embodiments, a maximum common operational frequency signal 301 is generated within a beat master, as described above. A first plurality of timing diagrams 302 show exemplary LINAC PRF (Pulse Repetition Frequency) set points that can be established or achieved through integer division of the maximum common operational frequency. A second plurality of timing diagrams 303 shows exemplary LINAC PRF set points that can be established or achieved through non-integer division. In embodiments, the frequencies/signals/operation of an individual X-ray source is not modified within the X-ray source itself. In embodiments, the frequency of the signal that is sent to the X-ray source, or LINAC, that triggers the generation of the X-ray pulse (or burst of X-rays) is modified. On every rising edge of the signal, the X-ray source will generate an X-ray pulse. The frequency of the trigger signal is the Pulse Repetition Frequency (PRF).

Figure 3B:
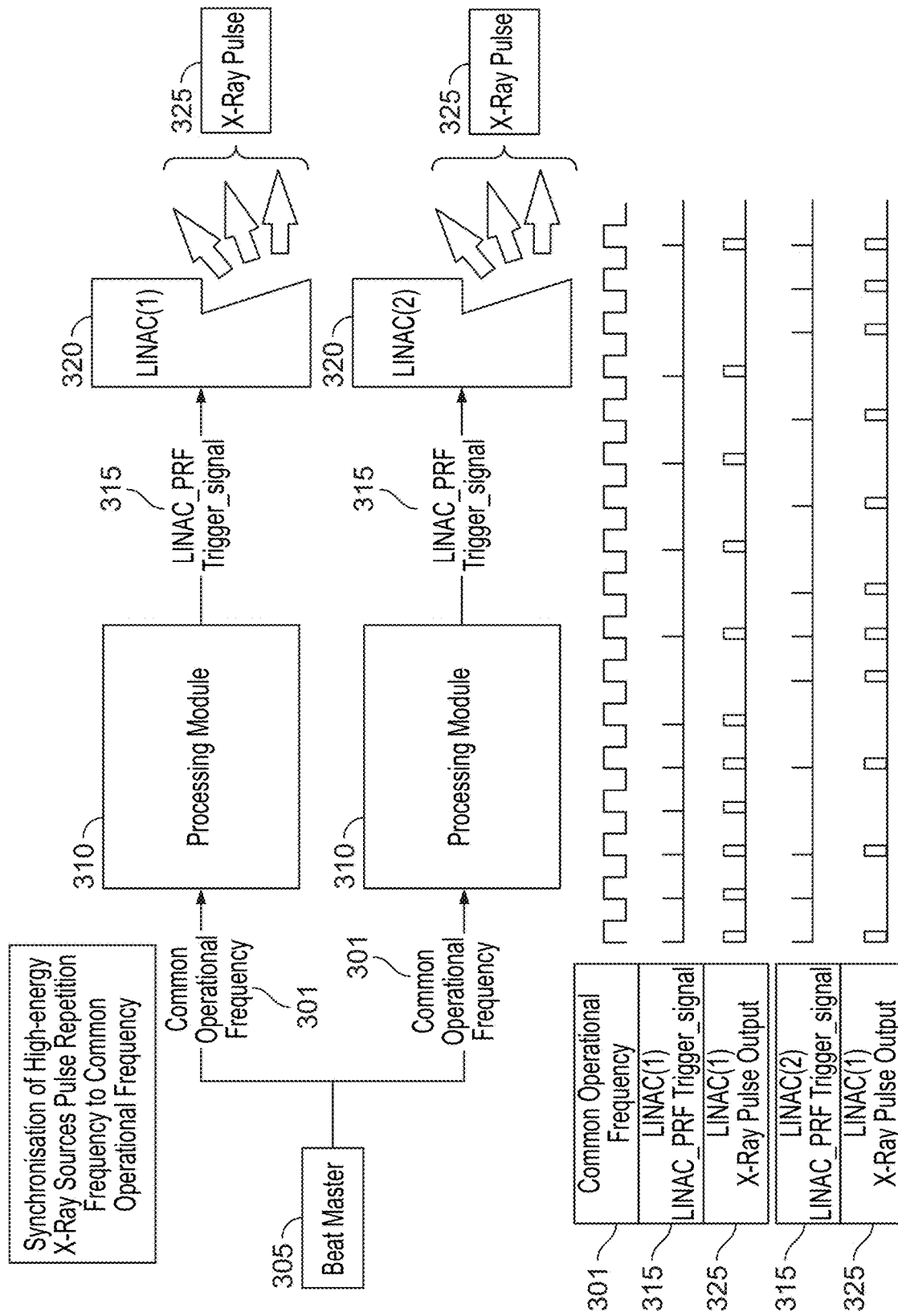
FIG. 3B provides a visual representation of the synchronization of multiple differing individual high-energy X-ray source pulse repetition frequencies to a common operational frequency, in accordance with an embodiment of the present specification.

FIG. 3B provides a visual representation of the synchronization of multiple differing individual high-energy X-ray source pulse repetition frequencies to a common operational frequency, in accordance with an embodiment of the present specification. In embodiments, a common operational frequency signal 301 is generated within the beat master 305, as described above. The common operational frequency 301 is communicated to at least one processing module 310 that is associated with at least one X-ray source, or LINAC, which then generates a PRF trigger signal 315. This signal is then communication to the LINAC 320, resulting in an X-ray pulse output 325. Thus, in embodiments, the processing module that is coupled to each high-energy X-ray source will receive the common operational frequency and will then generate a LINAC trigger-times pulse generation frequency signal, which is synchronous to the common operational frequency (LINAC_PRF TRIGGER_SIGNAL). The interval between the LINAC trigger-times will vary depending upon the required X-ray pulse repetition frequency of the system being employed.

Figure 4A:
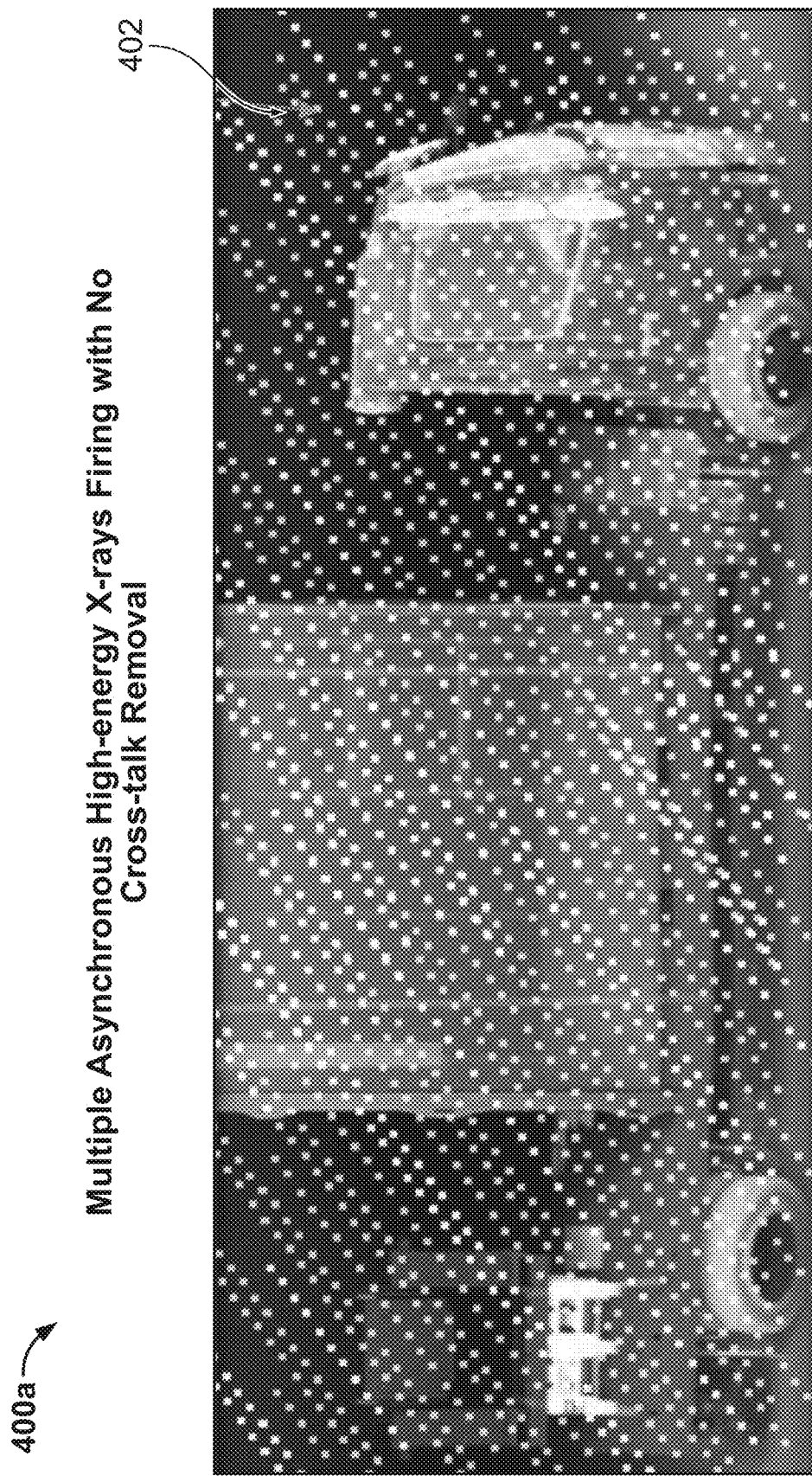
FIG. 4A shows a first scan image obtained via a low-energy backscatter X-ray inspection system located in proximity to a plurality of high-energy X-ray transmission inspection systems.

FIG. 4A shows a scan image 400a obtained via a low-energy backscatter X-ray inspection system located in proximity to a plurality of high-energy X-ray transmission inspection systems, wherein each individual high-energy X-ray transmission system is pulsing asynchronously, and wherein a significant impact of the cross-talk image corruption can be seen. The large number of white spot artifacts 402 result from the plurality of interference patterns resulting from the incoherent summation of multiple pulse repetition frequencies from the high-energy X-ray sources. While it is possible to remove such data using the techniques described above, the overall quality of the resulting image due to the significant number of corrected pixels would be reduced.

Figure 4B:
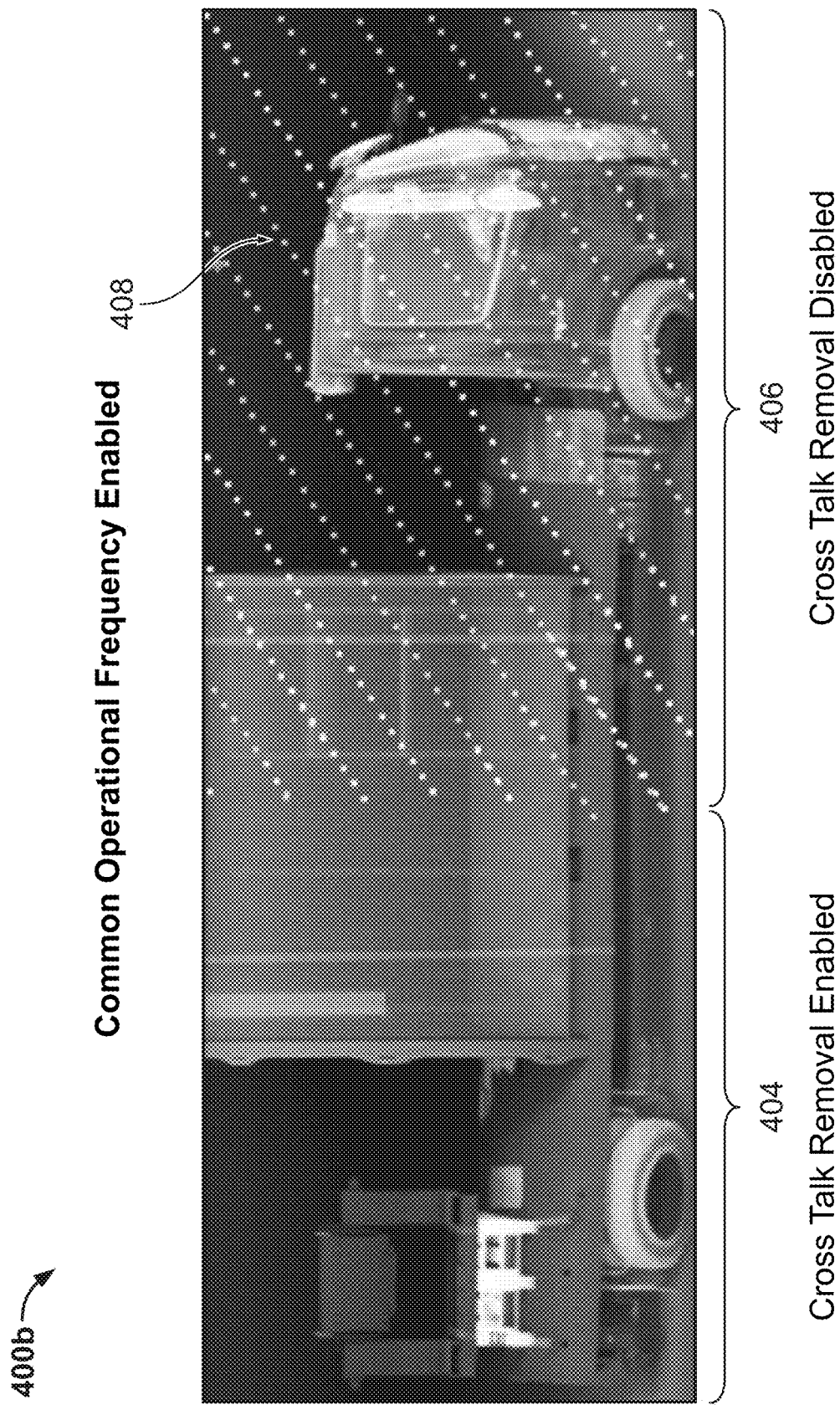
FIG. 4B shows a second scan image obtained via a low-energy backscatter X-ray inspection system located in proximity to a plurality of high-energy X-ray transmission inspection systems.

FIG. 4B shows a scan image 400b obtained via a low-energy backscatter X-ray inspection system located in proximity to a plurality of high-energy X-ray transmission inspection systems, wherein each individual high-energy X-ray transmission system is pulsing in synchronization. The effect of a cross-talk removal algorithm has been disabled from roughly half of the image 400b for comparative illustration. As shown, the image 400b comprises a first portion 404 and a second portion 406. Second portion 406 illustrates crosstalk due to multiple synchronized high-energy transmission systems operating in proximity to the low-energy backscatter system from which the image 400b is obtained. In embodiments, the crosstalk signal visible in second portion 406 occurs due to interference of operational frequencies of the low and high-energy X-ray systems and is dependent upon the relative frequency of operation between the systems. The crosstalk in second portion 406 is visible as a sequence of bright pixels 408, making the image portion 406 unclear and unsuitable for detecting any threat items that may be present in the object being scanned, albeit less impacted than when the multiple systems are operating asynchronously (as shown FIG. 4A). The first portion 404 appears clearer than second portion 406 as crosstalk due to the multiple high-energy transmission systems operating in proximity has been removed by using the systems and methods described in the present specification.

Figure 5:
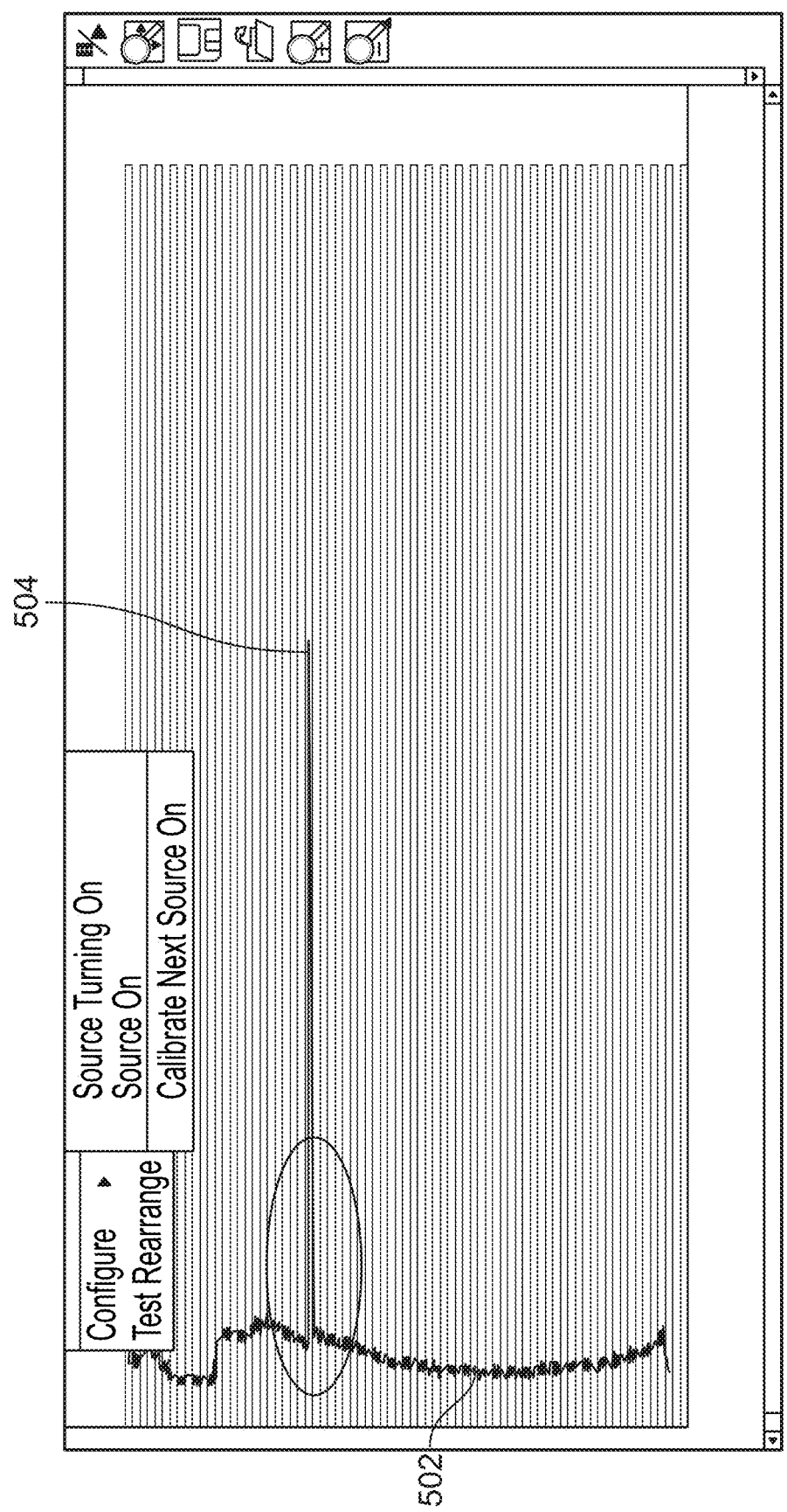
FIG. 5 illustrates a backscatter signal captured by a low-energy backscatter X-ray scanning system located in proximity to a high-energy X-ray scanning system.

FIG. 5 illustrates a backscatter signal 504 captured by a low-energy backscatter X-ray scanning system located in proximity to a high-energy X-ray scanning system. As can be seen, backscatter signal 502 is indicative of an unwanted signal originating from a LINAC-based high-energy X-ray transmission system. Conventional methods that rely on the magnitude of this pulse for removal of unwanted signals cannot be relied upon for mitigation due to the possibility of changing dose, changing distances of co-located systems and the asynchronous operation of multiple high-energy X-ray sources. In embodiments, the use of a common operational frequency distributed to the low-energy backscatter scanning system and RPM sub-system, in proximity to the high-energy scanning system, ensures that the cross talk signal 502 occurs at the same known time, thereby reducing the number of interference patterns to one and allowing implementation of mitigation techniques in low-energy backscatter and RPM systems.

FIG. 6A illustrates an exemplary system deployment scenario 600a, in accordance with an embodiment of the present specification. As shown in FIG. 6A, a standalone low-energy X-ray backscatter system 605 is co-located in proximity to both a high-energy X-ray transmission system 610 and low-energy X-ray backscatter system 630. In the deployment scenario 600, a beat master (that is, a master pulse generator unit) resides within the high-energy X-ray transmission system 610 and the common operational frequency (generated by the BEAT beat master) is distributed to the co-located, proximate low-energy X-ray backscatter system 630 as well as to the standalone adjacent low-energy X-ray backscatter system 605.

Figure 6B:
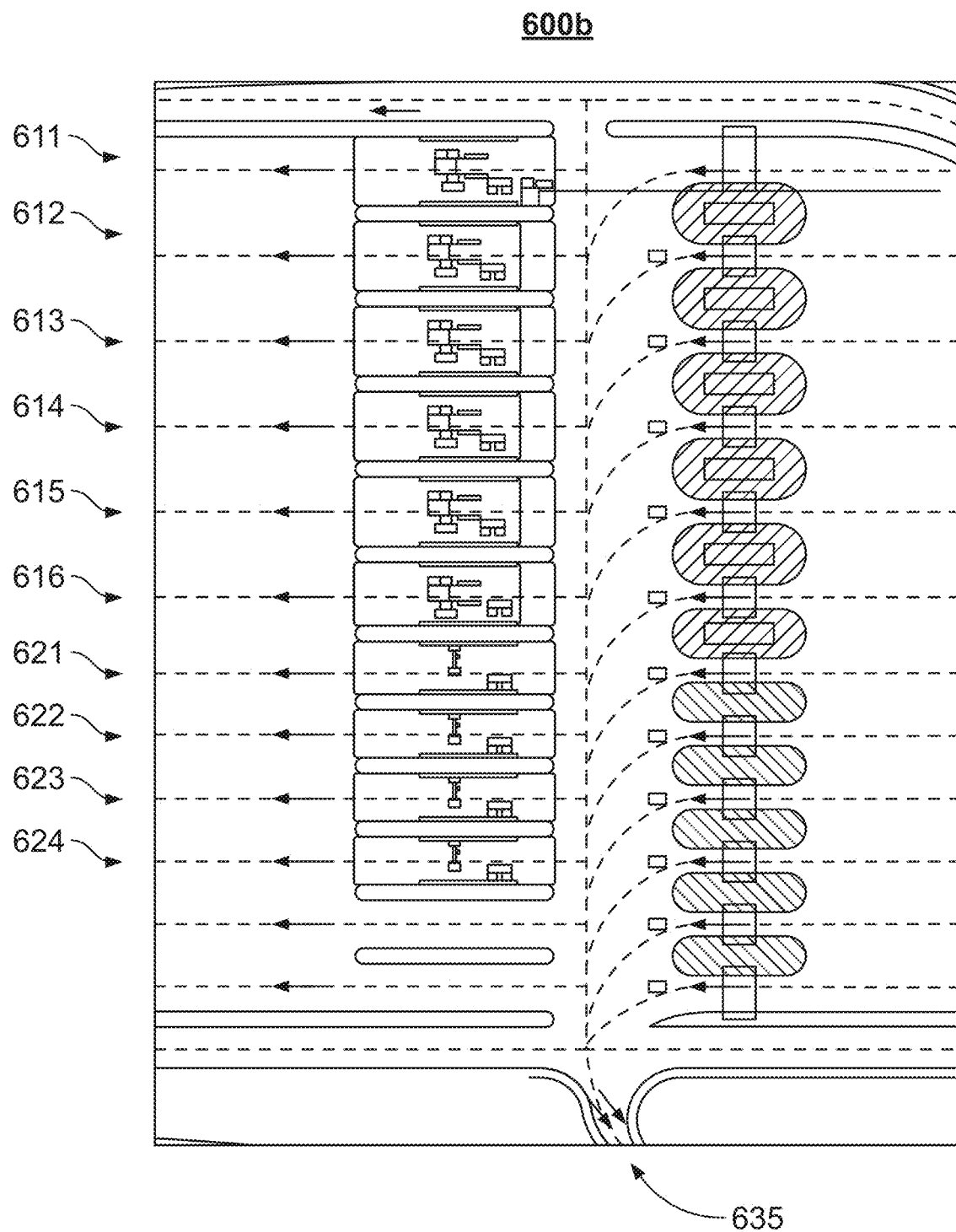
FIG. 6B illustrates another exemplary system deployment scenario, in accordance with an embodiment of the present specification.

FIG. 6B illustrates another exemplary system deployment scenario 600b, in accordance with an embodiment of the present specification. As shown in FIG. 6B, six high-energy X-ray transmission systems 611, 612, 613, 614, 615 and 616 (hereinafter, referred to collectively as "611-616") and four low-energy X-ray backscatter systems 621, 622, 623 and 624 (hereinafter, referred to collectively as "621-624") are located in close proximity. Consequently, there is interference from each of the six high-energy X-ray transmission systems 611-616 to each of the four low-energy X-ray backscatter systems 621-624. In some embodiments, the six high-energy X-ray transmission systems 611-616 are also capable of operating in a very low X-ray dose or "Cab-Scan" mode to support driver-occupied scanning. Each of the six high-energy X-ray transmission systems 611-616 require synchronous firing of the source to prevent interference with the adjacent, proximate low-energy X-ray backscatter systems. Hence, in some embodiments, one beat master 635 (that is, a master pulse generator unit) is provided in a building adjacent to the deployment scenario 600b, to generate a common operational frequency, along with a single ND_FOCUS (that is, slave unit) for each of the six high-energy X-ray transmission systems 611-616 and each of the four low-energy X-ray backscatter systems 621-624. This causes the high-energy X-ray transmission systems 611-616 to be employed at the common operational frequency and the low-energy X-ray backscatter systems 621-624 to receive data for blanking the cross-talk signal at the common operational frequency (received through, for example, fiber-optic cables).

Figure 7:
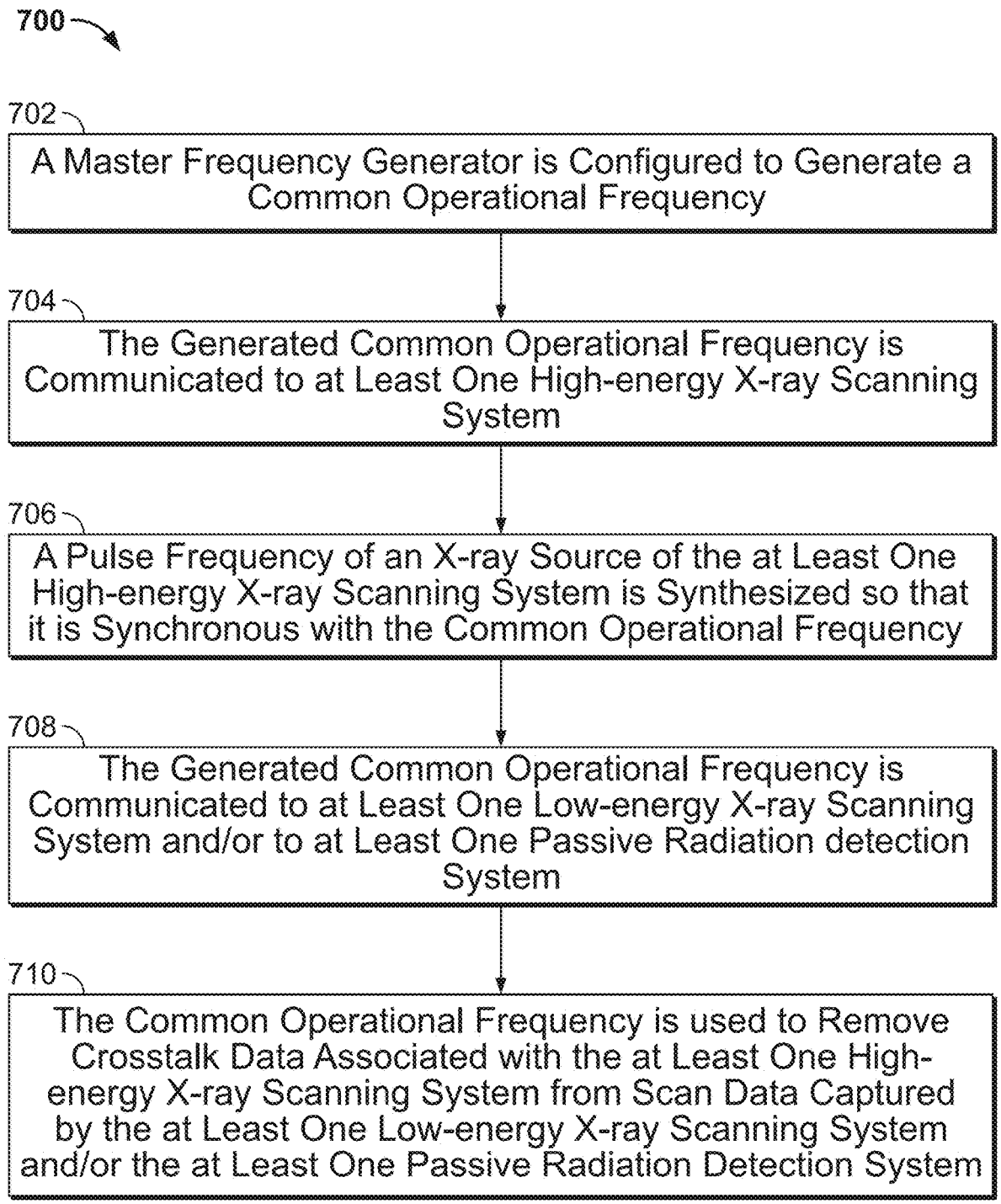
FIG. 7 is a flowchart of a plurality of exemplary steps of a method of eliminating crosstalk between a plurality of X-ray scanning systems, in accordance with some embodiments of the present specification.

FIG. 7 is a flowchart of a plurality of exemplary steps of a method for eliminating crosstalk between a plurality of X-ray scanning systems, in accordance with some embodiments of the present specification. At step 702, a master frequency generator is configured to generate a common operational frequency. At step 704, the generated common operational frequency is communicated to at least one high-energy X-ray scanning system. In some embodiments, the at least one high-energy X-ray scanning system is a LINAC based X-ray scanning platform. In various embodiments, the at least one high-energy X-ray scanning system is either fixed or mobile/portable.

At step 706, a pulse repetition frequency of an X-ray source of the at least one high-energy X-ray scanning system is synchronized with the common operational frequency. In embodiments, individual high-energy X-ray PRF (Pulse Repetition Frequency) values are synthesized so that they are synchronized to both integer and non-integer divisions of the common operational frequency.

In some embodiments, the pulse repetition frequency of the X-ray source of the at least one high-energy X-ray scanning system is modulated in order to accommodate different imaging/scanning scenarios, such as for example, varying a speed of the object being scanned as it passes through a high-energy X-ray scanning system configured as a portal system or by varying the speed of the X-ray source moving along the rails of a high-energy X-ray scanning system configured as a gantry system.

At step 708, the generated common operational frequency is communicated to at least one low-energy X-ray scanning system and/or to at least one passive radiation detection system. In some embodiments, the at least one high-energy X-ray scanning system and the at least one low-energy X-ray scanning system are located within a predefined distance of each other. In some embodiments, the at least one high-energy X-ray scanning system and the at least one passive radiation detection system are located within a predefined distance of each other. In some embodiments, the at least one high-energy X-ray scanning system, the at least one low-energy X-ray scanning system and the at least one passive radiation detection system are located within a predefined distance of each other. Various additional exemplary deployment scenarios have been described with reference to FIGS. 2A, 2B, 2C, 6A and 6B. In some embodiments, the predefined distance is less than 1000 meters.

In some embodiments, the at least one low-energy X-ray scanning system is an X-ray backscatter scanning system. In some embodiments, the at least one passive radiation detection system is a Radiation Portal Monitor (RPM). In various embodiments, the generated common operational frequency is communicated using any one or a combination of electrical, fiber-optic or wireless communication systems.

At step 710, the common operational frequency is used to remove crosstalk data associated with the at least one high-energy X-ray scanning system from scan data captured by the at least one low-energy X-ray scanning system and/or the at least one passive radiation detection system. In some embodiments, unwanted signal associated with crosstalk data corresponding to the common operational frequency are removed from an image generated by the low-energy X-ray scanning system. In some embodiments, crosstalk data corresponding to the common operational frequency is removed from scan data captured by the at least one passive radiation detection system.

The above examples are merely illustrative of the many applications of the system and method of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A system for eliminating crosstalk between at least a LINAC radiation source and a backscatter radiation source, the system comprising:
    a signal generator configured to generate at least one common signal, wherein the common signal comprises a series of pulses;
    a first radiation emitting scanning system comprising the LINAC radiation source, wherein the first radiation emitting scanning system is configured to receive the common signal and configured to cause the LINAC radiation source to emit X-ray pulses as a function of the common signal; and a second radiation emitting scanning system comprising the backscatter radiation source, wherein the second radiation emitting scanning system is configured to receive the common signal, is configured to operate concurrently with the first radiation emitting scanning system by emitting radiation and generating data concurrent with the first radiation emitting scanning system, and is configured to process said data to remove, blank or ignore any of said data that was acquired during any instance in which the common signal indicates the LINAC radiation source emitted one of said X-ray pulses.

2. The system of claim 1, wherein the LINAC radiation source comprises a linear particle accelerator operating in an energy range of 750 KeV to 10 MeV.

3. The system of claim 2, wherein the radiation source operates in an energy range of 120 KeV to 750 KeV.

4. The system of claim 1, wherein each pulse of the series of pulses is defined by a leading edge and a trailing edge.

5. The system of claim 4, wherein the first radiation emitting scanning system is configured to be triggered to cause the LINAC radiation source to emit X-ray pulses in coordination with at least one of the leading edge or the trailing edge of at least a portion of said each pulse of the series of pulses of the common signal.

6. The system of claim 1, further comprising at least one radiation portal monitor coupled with the signal generator for receiving the common signal, and wherein the at least one radiation portal monitor is configured to receive the common signal, is configured to generate data concurrent with the first radiation emitting scanning system, and is configured to process said data based upon the function of the common signal.

7. The system of claim 6, wherein the at least one radiation portal monitor is configured to process said data based upon the function of the common signal by removing data associated with a specific time if the LINAC radiation source was triggered to emit radiation at said specific time based on the common signal.

8. The system of claim 6, wherein the first radiation emitting scanning system is located within a predefined distance of the second radiation emitting scanning system and the at least one radiation portal monitor.

9. The system of claim 8, wherein the predefined distance is 1000 meters or less.

10. The system of claim 1, wherein each pulse of the series of pulses is in a form of a square wave.

11. A method for eliminating crosstalk between at least a LINAC radiation source and a backscatter radiation source, the method comprising:

generating at least one common signal, using a signal generator, wherein the common signal comprises a series of pulses;

receiving the common signal at a first radiation emitting scanning system comprising the LINAC radiation source;

using the LINAC radiation source of the first radiation emitting scanning system, emitting X-ray pulses as a function of the received common signal;

receiving the common signal at a second radiation emitting scanning system comprising the backscatter radiation source;

emitting radiation concurrent with the first radiation emitting scanning system and generating data concurrent with the first radiation emitting scanning system using the backscatter radiation source of the second radiation emitting scanning system; and processing data at the second radiation scanning system to remove, blank or ignore any of said data that was acquired during any instance in which the common signal indicates the LINAC radiation source emitted one of said X-ray pulses.

12. The method of claim 11, wherein the LINAC radiation source comprises a linear particle accelerator operating in an energy range of 750 KeV to 10 MeV.

13. The method of claim 12, wherein the X-ray backscatter radiation source operates in an energy range of 120 KeV to 750 KeV.

14. The method of claim 11, wherein each pulse of the series of pulses is defined by a leading edge and a trailing edge.

15. The method of claim 14, wherein the first radiation emitting scanning system is triggers the LINAC radiation source to emitting radiation in coordination with at least one of the leading edge or the trailing edge of at least a portion of said each pulse of the series of pulses.

16. The method of claim 11, wherein at least one radiation portal monitor coupled with the signal generator receives the common signal, generates data concurrent with the first radiation emitting scanning system, and processes said data based upon the function of the common signal.

17. The method of claim 16, wherein the at least one radiation portal monitor processes said data based upon the function of the common signal by removing data associated with a specific time if the LINAC radiation source was triggered to emit radiation at said specific time based on the common signal.

18. The method of claim 17, wherein the first radiation emitting scanning system is positioned within a predefined distance of the second radiation emitting scanning system and the at least one radiation portal monitor.

19. The method of claim 18, wherein the predefined distance is 1000 meters or less.

20. The method of claim 11, wherein each pulse of the series of pulses is in a form of a square wave.

* * * * *